United States Patent
Nainar et al.

(10) Patent No.: US 10,785,701 B2
(45) Date of Patent: Sep. 22, 2020

(54) HYBRID CONTROL PLANE ENTITY FOR FAT TREE ROUTE DISAGGREGATION

(71) Applicant: Cisco Technology, Inc., San Jose, CA (US)

(72) Inventors: Nagendra Kumar Nainar, Morrisville, NC (US); Pascal Thubert, La Colle sur Loup (FR); Carlos M. Pignataro, Cary, NC (US)

(73) Assignee: Ciscot Technology, Inc., San Jose, CA (US)

( * ) Notice: Subject to any disclaimer, the term of this patent is extended or adjusted under 35 U.S.C. 154(b) by 52 days.

(21) Appl. No.: 16/188,627

(22) Filed: Nov. 13, 2018

(65) Prior Publication Data

US 2019/0394701 A1 Dec. 26, 2019

Related U.S. Application Data

(60) Provisional application No. 62/690,007, filed on Jun. 26, 2018.

(51) Int. Cl.
| | |
|---|---|
| *H04W 40/26* | (2009.01) |
| *H04L 12/715* | (2013.01) |
| *H04L 12/753* | (2013.01) |
| *H04L 12/707* | (2013.01) |
| *H04W 40/04* | (2009.01) |
| *H04W 40/34* | (2009.01) |
| *H04L 12/741* | (2013.01) |

(52) U.S. Cl.
CPC .............. *H04W 40/26* (2013.01); *H04L 45/22* (2013.01); *H04L 45/46* (2013.01); *H04L 45/48* (2013.01); *H04L 45/54* (2013.01); *H04W 40/04* (2013.01); *H04W 40/34* (2013.01)

(58) Field of Classification Search
CPC ......... H04L 45/22; H04L 45/46; H04L 45/48; H04L 45/54; H04W 40/26; H04W 40/04; H04W 40/34
See application file for complete search history.

(56) References Cited

U.S. PATENT DOCUMENTS

| | | | |
|---|---|---|---|
| 9,007,895 B2 | 4/2015 | Schlansker et al. | |
| 9,210,071 B2* | 12/2015 | Allan | H04L 45/06 |
| 9,577,956 B2 | 2/2017 | Bogdanski et al. | |
| 2016/0134520 A1* | 5/2016 | Kapadia | H04L 45/64 370/392 |
| 2018/0183706 A1* | 6/2018 | Przygienda | H04L 45/32 |
| 2018/0367412 A1* | 12/2018 | Sethi | H04L 43/10 |
| 2019/0149896 A1* | 5/2019 | Grammel | H04L 41/0816 398/3 |

OTHER PUBLICATIONS

Rafal Szarecki, "Lost in Fat Tree forest and route out," Juniper Networks, 2016, pp. 1-30, available at https://www.nanog.org/sites/default/files/3_Szarecki_Lost_In_Fat_Tree.pdf.

(Continued)

*Primary Examiner* — Rasheed Gidado
(74) *Attorney, Agent, or Firm* — Merchant & Gould P.C.

(57) ABSTRACT

In one embodiment, a method is performed. A fat tree route miner (FT-RM) entity may be used to establish a control plane session with a first spine node in communication with a network. The FT-RM entity may identify a prefix that is unreachable by the first spine node. The FT-RM entity may instruct a spine node to disaggregate the prefix.

17 Claims, 19 Drawing Sheets

(56) References Cited

OTHER PUBLICATIONS

Alankar Sharma, "DC Routing: Current Challenges and RIFT (Routing in Fat Trees)," NBC Comcast, Jun. 2018, pp. 1-24, available at https://pc.nanog.org/static/published/meetings/NANOG73/1694/20180626_Sharma_Rift_Routing_In_v1.pdf.
Przygienda et al., "RIFT: ROuting in Fat Trees," IETF RIFT Workign Group, Internet-Draft, Mar. 2018, pp. 1-58, available at https://www.ietf.org/archive/id/draft-przygienda-rift-05.txt.
Greenberg et al., Randomized Routing on Fat-Trees, Mass. Inst. of Tech., Jul. 1987, pp. 1-24.
Vasseur et al., "Patch Computation Element (PCE) Communication Protocol (PCEP)," IETF Network Working Group, RFC 5440, Mar. 2009, pp. 1-74, available at https://tools.ietf.org/html/rfc5440.

\* cited by examiner

HYBRID CONTROL PLANE ENTITY FOR FAT TREE ROUTE DISAGGREGATION

PRIORITY CLAIM

This application claims priority to U.S. Provisional Patent App. No. 62/690,007, filed on Jun. 26, 2018, which is hereby incorporated by reference in its entirety.

TECHNICAL FIELD

The present disclosure generally relates to networking.

BACKGROUND

Routing in Fat Trees (RIFT) is an Internet Engineering Task Force (IETF) working group whose aim is to design a routing protocol specifically optimized for cloud fabric underlays.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
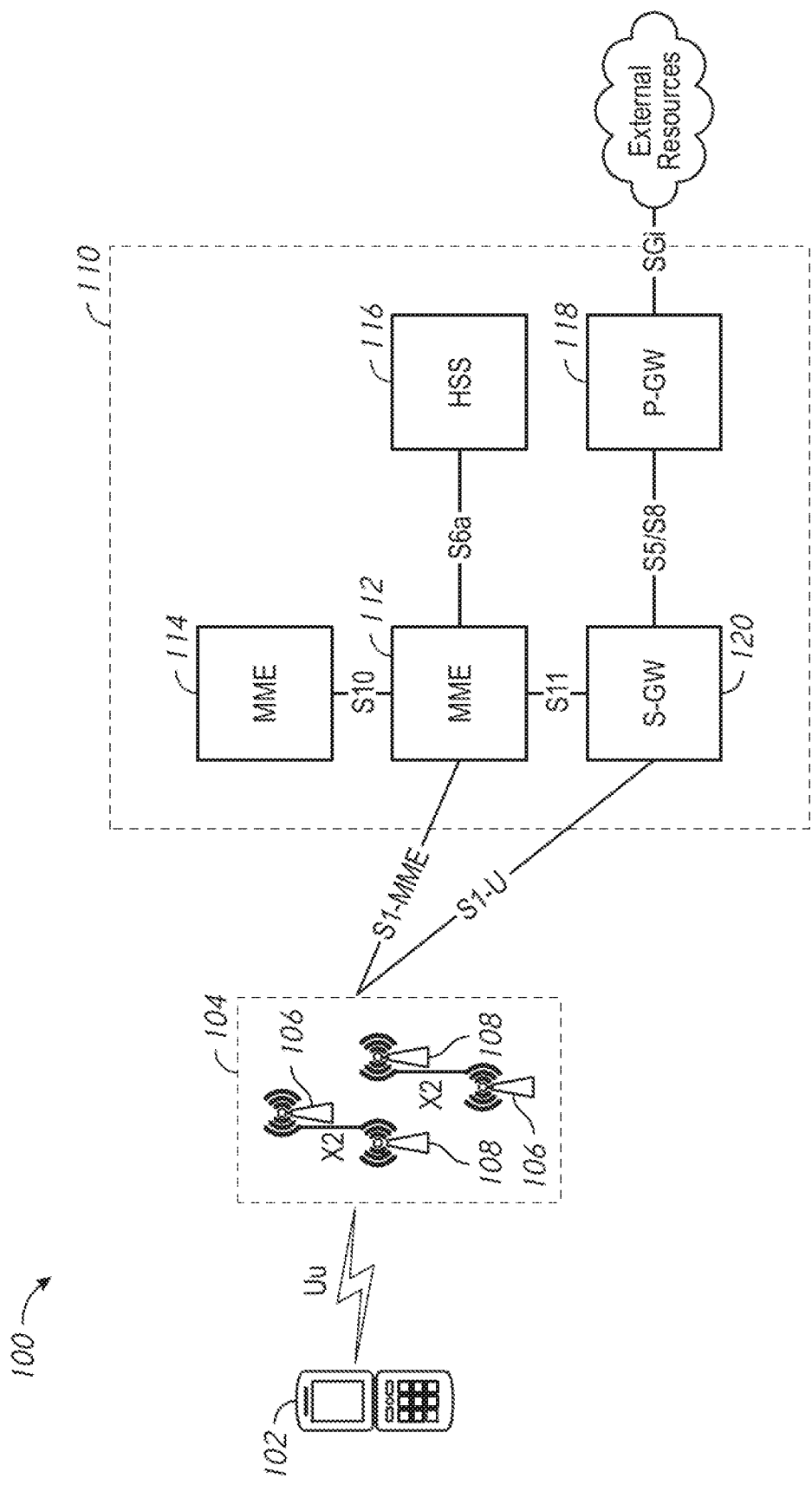
FIG. 1 is a diagram that illustrates an example long term evolution (LTE) network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for fat tree routing. A virtual network function (vNF) entity, e.g., a fat tree route miner (RM) is disclosed. The fat tree RM may be implemented as a control plane entity, e.g., a hybrid control plane entity, for fat tree routing protocols, such as routing in fat trees (RIFT) or intermediate system to intermediate system (ISIS)-spine-leaf. In a spine-leaf topology, a leaf node may connect to a number of spine nodes. Data traffic going from one leaf node to another leaf node may pass through one of the spine nodes. The fat tree RM may create a control plane session (e.g., only) for spine nodes. The fat tree RM may use a border gateway protocol—link state (BGP-LS) and/or a RIFT extension to retrieve a list of prefixes that may be reached from a spine node.

In an embodiment, a fat tree route miner (FT-RM) entity may be used to establish a control plane session with a first spine node in communication with a network. The FT-RM entity may identify a prefix that is unreachable by the first spine node. The FT-RM entity may instruct a spine node to disaggregate the prefix.

Example Embodiments

FIG. 1 illustrates an example long term evolution (LTE) network 100. The LTE network 100 may include a user equipment (UE) device 102, such as a mobile telephone. It will be appreciated that the LTE network 100 typically includes multiple UE devices 102; however, one UE device 102 is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more eNodeB (eNB) entities 106. The E-UTRAN 104 may include one or more next generation NodeB (gNB) devices 108. The one or more gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The MMEs 112, 114 may communicate with the E-UTRAN 104 via a S1-MME interface and may communicate with one another via a S10 interface. The MMEs 112, 114 may control high-level operation of the EPC network 110 using signaling messages and a home subscriber server (HSS) 116, with which they may communicate via an S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via an SGi interface. A serving gateway (SGW) 120 may communicate with the MMEs 112, 114 using an S11 interface and with the E-UTRAN 104 using the S1-U interface. The SGW 120 may forward data between a base station and the PGW 118. The SGW 120 and the PGW 118 may communicate with one another via an S5/S8 interface.

When the UE device 102 establishes a connection with the LTE network 100, an eNB entity 106 may select a MME, e.g., the MME 112 or the MME 114, with which the UE device 102 may register. If the UE device 102 has fifth generation (5G) capability, it may publish its 5G capability in non-access stratum (NAS) messaging. An MME that has 5G non-standalone architecture (NSA) capability may extract the UE device capability information from the NAS messaging and may receive 5G subscription information for the subscriber from the HSS 116. A 5G-capable MME may assist in establishing 5G sessions in the LTE network 100.

Figure 2:
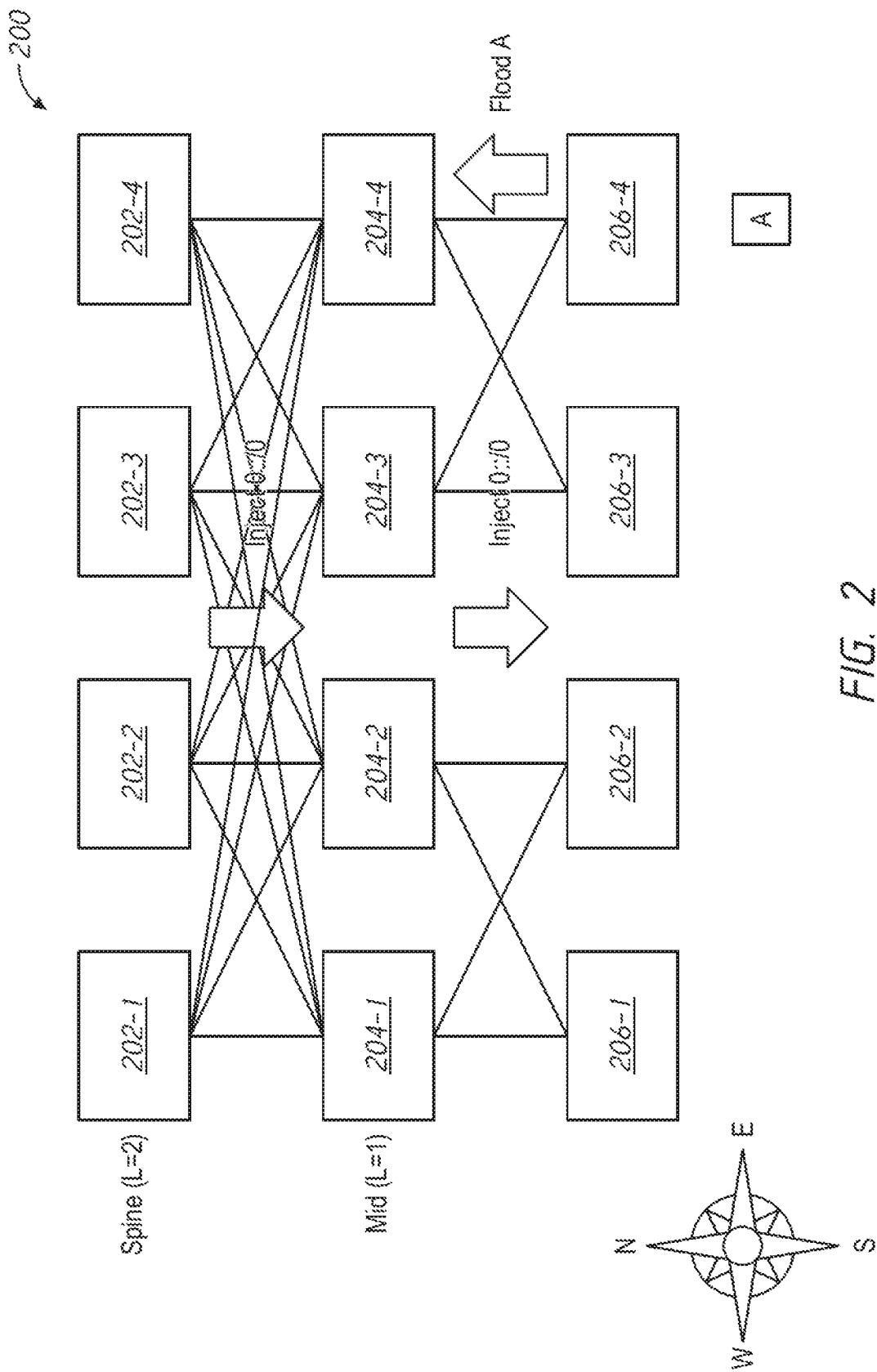
FIG. 2 is an example node graph that illustrates an example network.

FIG. 2 is an example node graph that illustrates an example network 200. The network 200 may include spine nodes 202-1, 202-2, 202-3, and 202-4, which may be collectively referred to as spine nodes 202. The network 200 may include mid-level nodes 204-1, 204-2, 204-3, and 204-4, which may be collectively referred to as mid-level nodes 204. The network 200 may include leaf nodes 206-1, 206-2, 206-3, and 206-4, which may be collectively referred to as leaf nodes 206. The network 200 may have a topology that may be implemented as a fat tree that may be substantially fully meshed between the spine nodes 202 and the mid-level nodes 204. The network 200 may be partitioned in pods. For example, to limit the number of ports per leaf switch, leaves may be grouped in pods.

In order to speed up convergence in a control plane, routing in fat trees (RIFT) may operate in an anisotropic fashion. For example, nodes may flood down south (e.g., from the spine nodes 202 toward the leaf nodes 206) the advertisement of a default route in a distance vector (DV) fashion. The default route may be recomputed and/or reissued at each hop. Packets may be forwarded northward, e.g., by default.

In a network, flooding may involve the forwarding by a router of a packet from a node to every other node attached to the router except the node from which the packet arrived. Flooding may facilitate distributing routing information updates quickly to every node in a large network. Flooding may be used in multicast packet, e.g., from one source node to many specific nodes in a real or virtual network.

As another example, nodes may flood up north (e.g., from the leaf nodes 206 toward the spine nodes 202) the advertisement of more specific routes that may be reachable via a particular node in a link state (LS) fashion. Topological information may be flooded. Reachability information may be flooded, for example, after the topological information is flooded. Packets that may match more specific routes (e.g., as compared with a default route) may be forwarded southward.

In some embodiments, a default route may be designated. For example, a distance vector (DV) operation may advertise a default route. In some scenarios, a spine node, e.g., the spine node 202-1, may not be able to see a particular leaf node, such as the leaf node 206-4. The spine node 202-1 may not be able to reach a prefix that is attached to a leaf node that it cannot see. An exception to the default route may be installed or configured in the network so that packets destined for the prefix are not routed to a dead end. The process of sending a southbound route injection to cover the reachability exception may be known as a route disaggregation.

For example, a route disaggregation may be a negative disaggregation that may specify that all spine nodes may be used as default routers to reach all prefixes, with the exception that the spine node 202-1 may not be used as a router to reach a particular prefix, e.g., a prefix that is attached to a leaf node that the spine node 202-1 cannot see. A negative disaggregation may specify an exception to a default route advertised by one or more northbound nodes. A negative disaggregation may be sent from spine nodes that may not be able to reach the particular prefix. A negative disaggregation may be flooded transitively, e.g., children nodes of a node may repeat a node advertisement south.

A route disaggregation may be a positive disaggregation that may specify spine nodes that may be used as a default router to reach a prefix. A positive disaggregation may be sent southward from one or more (e.g., most or all) spine nodes that may still reach the leaf node that is attached to the prefix. For example, a positive disaggregation may be flooded one hop to nodes south of the spine nodes. In some scenarios, a positive disaggregation may be flooded transitively so that it reaches the leaf nodes.

Figure 3:
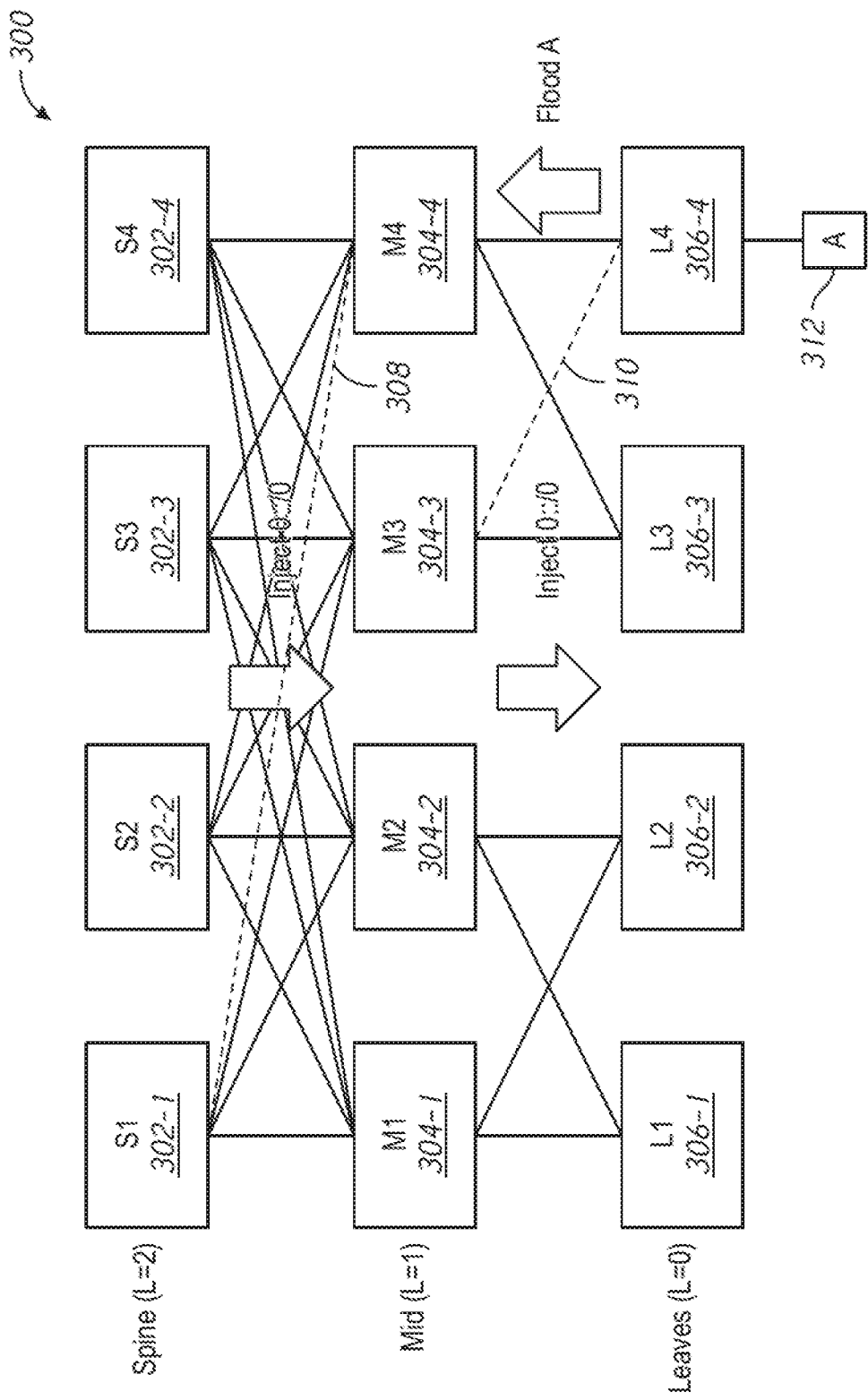
FIG. 3 is an example node graph that illustrates an example network with route disaggregation.

FIG. 3 is an example node graph that illustrates an example network 300 with route disaggregation. The network 300 may include spine nodes 302-1, 302-2, 302-3, and 302-4, which may be collectively referred to as spine nodes 302. The network 300 may include mid-level nodes 304-1, 304-2, 304-3, and 304-4, which may be collectively referred to as mid-level nodes 304. The network 300 may include leaf nodes 306-1, 306-2, 306-3, and 306-4, which may be collectively referred to as leaf nodes 306. The network 300 may have a topology that may be implemented as a fat tree that may be substantially fully meshed between the spine nodes 302 and the mid-level nodes 304. The network 300 may be partitioned in pods.

The network 300 may have one or more broken links, e.g., links 308 and 310 indicated by dashed lines in FIG. 3. Due to these broken links, one or more spine nodes 302 may be isolated from one or more leaf nodes 306. For example, the spine node 302-1 may be isolated from the leaf node 306-4. As a result, floodings from and about the leaf node 306-4 may not reach the spine node 302-1.

A prefix 312 may be attached to the leaf node 306-4. If floodings from and about the leaf node 306-4 may not reach the spine node 302-1, then the spine node 302-1 may not be able to forward packets to the prefix 312.

In some embodiments, route disaggregation may be used to transmit exceptions to the default route from RIFT nodes, e.g., the spine nodes 302, southward. An example exception may be that all of the mid-level nodes 304 may use all of the spine nodes 302 as default routers, with the exception of the spine router 302-1 when attempting to reach the prefix 312.

Figure 4:
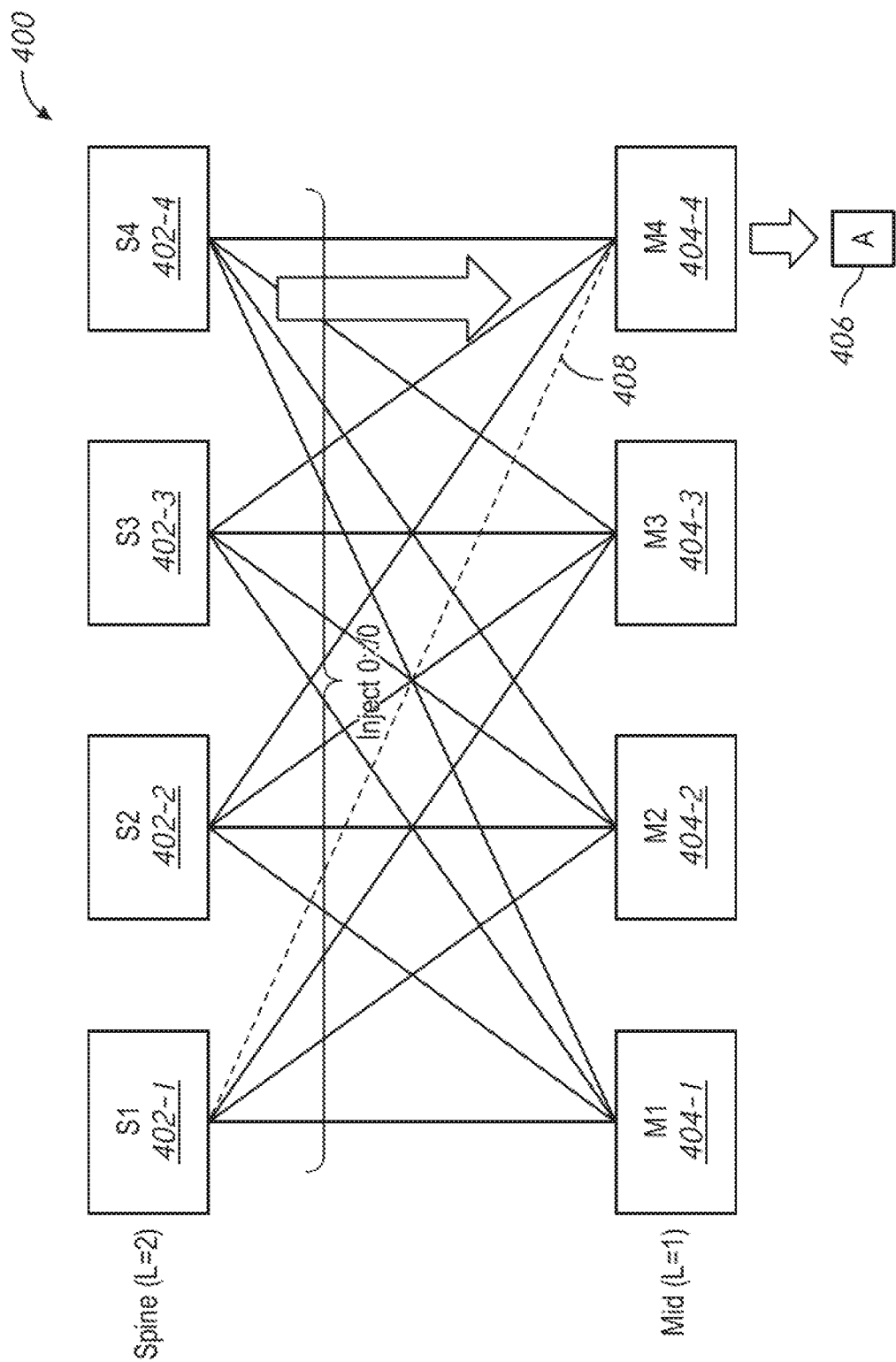
FIG. 4 is an example node graph that illustrates a portion of an example network with route disaggregation.

FIG. 4 is an example node graph that illustrates a portion of an example network 400 with route disaggregation. The network 400 may include spine nodes 402-1, 402-2, 402-3, and 402-4, which may be collectively referred to as spine nodes 402. The network 400 may include mid-level nodes 404-1, 404-2, 404-3, and 404-4, which may be collectively referred to as mid-level nodes 404. The network 400 may include leaf nodes (not shown) that may be arranged similarly to the configuration in FIG. 3. The network 400 may include a prefix 406 that may be attached to the mid-level node 404-4 or to a leaf node (not shown).

In the example network 400, the spine nodes 402-2, 402-3, and 402-4 may be valid default routers. The spine node 402-1 may not be a valid default router. For example, a communication link 408 between the spine node 402-1 and the mid-level node 404-4 may have failed, as shown by the dashed line in FIG. 4. The spine nodes 402-1, 402-2, 402-3, and 402-4 may have advertised the default route. Accordingly, it may be desired to ensure that the mid-level nodes 404-1, 404-2, and 404-3 get all the packets that are destined for the prefix 406.

In some embodiments, some spine nodes 402 and nodes at lower levels, e.g., mid-level nodes 404, may have reachability to one or more prefixes that neighbors at the same level may not be able to reach. These nodes 402, 404 that have reachability to these one or more prefixes may advertise south a more specific route to the one or more prefixes. For example, in the example network 400, if the mid-level node 404-4 has reachability to the prefix 406 and the mid-level nodes 404-1, 404-2, and 404-3 do not have reachability to the prefix 406, the mid-level node 404-4 may advertise a more specific route to the prefix 406.

In some embodiments, route disaggregation may be transitive when children nodes of a node may repeat the more specific node advertisement south. This may occur, for example, when a mid-layer node 404 is unable to reach a spine node 402 that can reach the prefix 406.

A spine node 402 may have a partial view of the network 400, e.g., a spine node 402 may be aware of the existence and/or status of a subset of the nodes of the network 400. A spine node 402 may have a partial view of the network 400, for example, if the network 400 has incomplete interconnectivity at the spine level. A spine node 402 that has a partial view of the network 400 may be unable to determine whether disaggregation is needed. A spine node 402 that has a partial view of the network 400 may be unable to determine whether route disaggregation may be needed and, if so, whether the disaggregation may need to be transitive.

Figure 5:
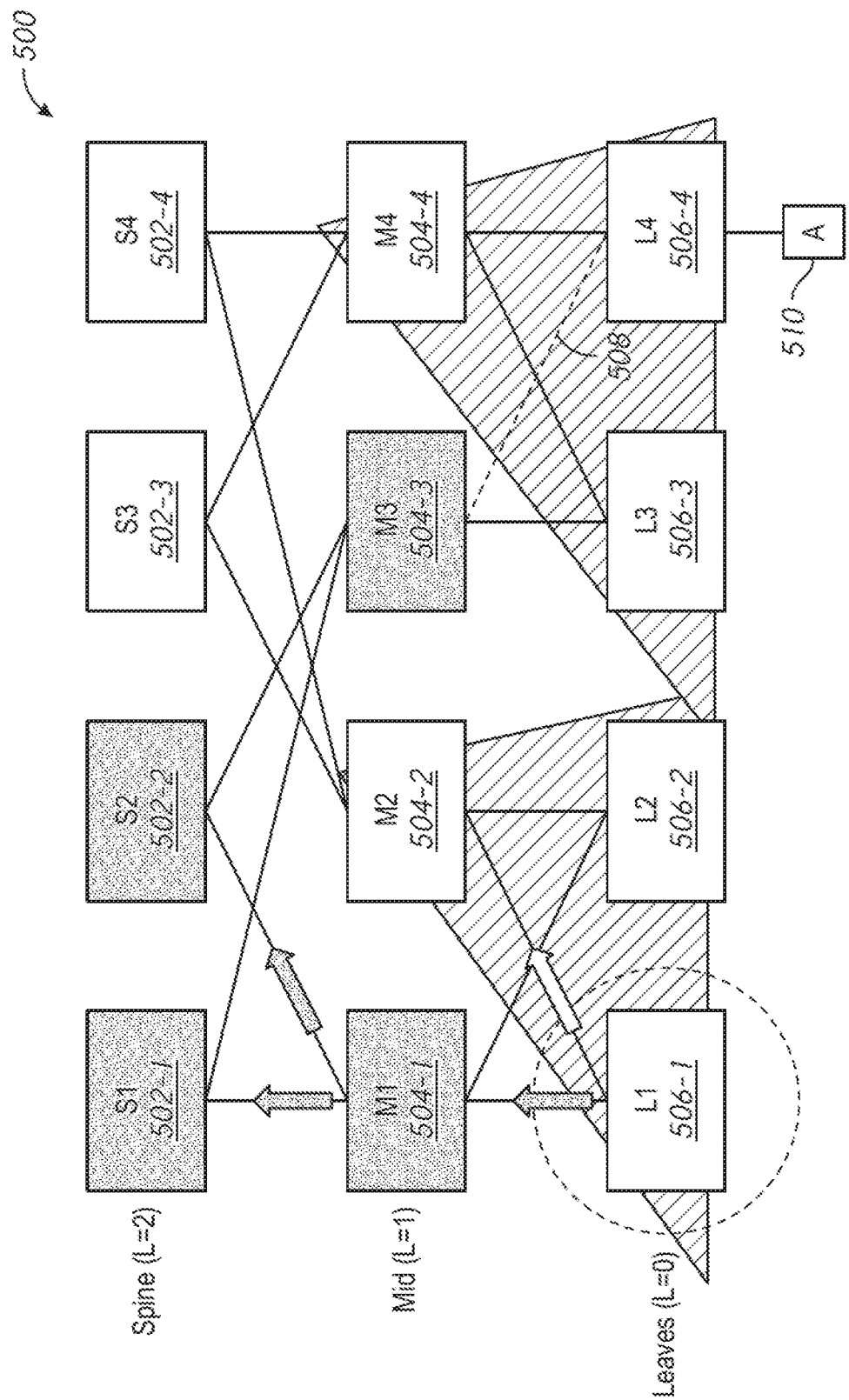
FIG. 5 is an example node graph that illustrates a portion of an example network with route disaggregation.

FIG. 5 is an example node graph that illustrates an example network 500 with route disaggregation. The network 500 may include spine nodes 502-1, 502-2, 502-3, and 502-4, which may be collectively referred to as spine nodes 502. The network 500 may include mid-level nodes 504-1, 504-2, 504-3, and 504-4, which may be collectively referred to as mid-level nodes 504. The network 500 may include leaf nodes 506-1, 506-2, 506-3, and 506-4, which may be collectively referred to as leaf nodes 506. The network 500 may have a topology that may be implemented as a fat tree that may be substantially fully meshed between the spine nodes 502 and the mid-level nodes 504. The network 500 may be partitioned in pods.

In the example network 500, incomplete visibility between nodes may cause issues. For example, a link 508 between the mid-level node 504-3 and the leaf node 506-4 may break. A prefix 510 may be attached to the leaf node 506-4. With the link 508 broken, the spine nodes 502-1 and 502-2 and the mid-level nodes 504-1 and 504-3 may be unable to reach the prefix 510. The spine node 502-4 may not know whether the spine nodes 502-1 and 502-2 exist. Even if the spine node 502-4 knows that the spine nodes 502-1 and 502-2 exist, the spine node 502-4 may not know what the mid-level node 504-1 may advertise to the spine nodes 502-1 and 502-2.

Figure 6:
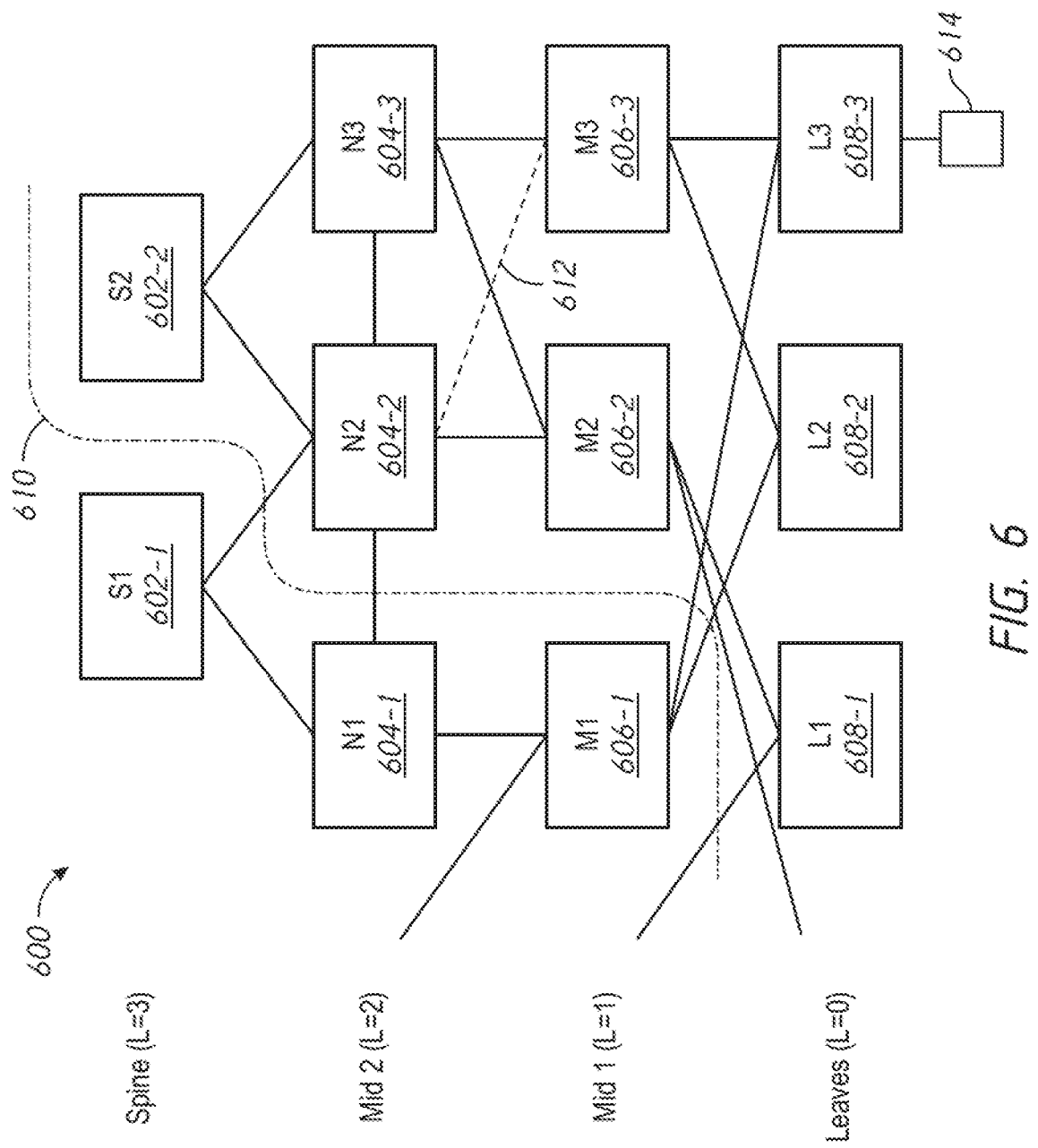
FIG. 6 is an example node graph that illustrates a portion of an example network with route disaggregation.

FIG. 6 is an example node graph that illustrates an example network 600 with route disaggregation. The network 600 may include spine nodes 602-1 and 602-2, which may be collectively referred to as spine nodes 602. The network 600 may include mid-level nodes that may be organized in multiple levels, e.g., mid-level nodes 604-1, 604-2, and 604-3 (collectively known as mid-level nodes 604) and mid-level nodes 606-1, 606-2, and 606-3 (collectively known as mid-level nodes 606). The network 600 may include leaf nodes 608-1, 608-2, and 608-3 (collectively known as leaf nodes 608).

Incomplete perception of the network 600 may result in false positives. For example, the spine node 602-2 may be associated with a shadow cone, e.g., a set of nodes that the spine node 602-2 can flood with a recursive disaggregation. A northern boundary 610 of the shadow cone may demarcate the extent of the nodes of which the spine node 602-2 may have full awareness. For example, the spine node 602-2 may know that the spine node 602-1, which is outside of the shadow cone, has connectivity from the mid-level node 604-1 (which is also outside of the shadow cone), but the spine node 602-2 may not know which connectivity the spine-node 602-1 has from the mid-level node 604-1. Through reflection, the spine node 602-2 may know about the adjacencies of other spine nodes, so that the spine node 602-2 can guess their aggregate one-hop flooding scope for disaggregated routes. However, the spine node 602-2 may know whether the other spine nodes 602 flood only if the spine node 602-2 knows all of the children nodes of the other spine nodes 602.

The spine node 602-2 may not have sufficient information to determine a course of action in the event that a link 612 between the mid-level node 604-2 and the mid-level node 606-3 may break. In the absence of this information, the spine node 602-2 may behave optimistically and presume that the nodes that it cannot see will cover the connectivity that is needed to reach a prefix 614 that is attached to the leaf node 608-3. The spine node 602-2 may behave pessimistically and presume that the nodes that it cannot see will not cover the needed connectivity to reach the prefix 614. This pessimistic approach may be safer in that it is more likely to ensure connectivity to the prefix 614. The pessimistic approach may, in some cases, lead to unnecessary route disaggregation. For example, in the network 600, the spine node 602-1 has connectivity to the leaf node 608-3, and therefore to the prefix 614, via the mid-level nodes 604-1 and 606-1, which are outside the shadow cone of the spine node 602-2 and which may not be subject to examination by the spine node 602-2.

In a complex fat tree with a disjoint spine, even a pessimistic approach may lead to so-called black holes in which connectivity may not be ensured. In the context of networking, a black hole may be a place in a network in which incoming and/or outgoing traffic may be silently discarded or dropped without informing the source that the data did not reach its intended recipient. The pessimistic approach may not have complete awareness of all of the spine nodes in a network. Virtual links may be used to join spine nodes, but the use of virtual links to join spine nodes may not be effective in link state routing protocols.

In some embodiments, RIFT may take a pessimistic approach to decrease the likelihood of black holes. In order to keep the base protocol simple, route disaggregation may always be performed transitively because it may be difficult to determine whether it is necessary to perform route disaggregation transitively in a given situation.

In some embodiments, a node may determine which routes may be disaggregated (e.g., may need to be disaggregated) in a network, where the disaggregated routes may be installed to obtain protection (e.g., optimal protection) and retain all available paths, and/or which spine nodes may inject which routes. A node that has full visibility of the whole topology of the network may make these determinations.

In some embodiments, a fat tree route miner (FT-RM) entity may be implemented as a control plane entity, e.g., a hybrid control plane entity, for fat tree routing protocols, such as RIFT or ISIS-spine-leaf. An FT-RM entity may create a control plane session to interface with spine nodes. The FT-RM entity may use a border gateway protocol—link state (BGP-LS) and/or a RIFT extension to retrieve a list of prefixes that may be reached from a spine node. The FT-RM entity may determine and/or analyze an entire network topology, e.g., to determine where and by which spine node one or more disaggregated routes may be installed. Determining and/or analyzing the entire network topology may involve a higher cost in control as compared with determining and/or analyzing a portion of the network topology.

In some embodiments, the FT-RM entity may analyze a list of prefixes from one or more spine nodes (e.g., each spine node) to identify any prefix or prefixes that one or more spine nodes cannot reach. The FT-RM entity may select one or more other spine nodes to disaggregate the unreachable prefix or prefixes to avoid traffic black holing. The FT-RM entity may instruct one or more spine nodes (e.g., each spine node) of a collection of one or more prefixes to disaggregate.

In some embodiments, the FT-RM entity may determine whether to implement a positive disaggregation or a negative disaggregation, as disclosed herein. For example, the FT-RM entity may determine to implement a positive disaggregation if the FT-RM can do so without transitive flooding. The FT-RM entity may determine to implement a positive disaggregation unless a large amount of data traffic would be involved in performing the disaggregation, e.g., if many spine nodes would need to disaggregate. The FT-RM entity may communicate with the spine nodes that are still able to reach the prefix in question. The FT-RM entity may coordinate with the spine nodes to ensure that the positive disaggregations are carried out substantially simultaneously to avoid a situation in which one spine node advertises a positive disaggregation and attracts traffic before disaggregation messages from other disaggregating spine nodes are received. On the other hand, the FT-RM entity may determine to implement a negative disaggregation if the disaggregation needs to be performed transitively. The FT-RM entity may determine to implement a negative disaggregation if a negative disaggregation would involve less signaling than a positive disaggregation.

The FT-RM entity may analyze the list of prefixes from one or more spine nodes to maintain the list over time. For example, a spine node that had lost reachability to a prefix may later regain reachability to the prefix. In this scenario, the FT-RM entity may remove the disaggregation such that future packets destined for the prefix may be routed via the default route.

In some embodiments, if information relating to the whole network topology is available to the FT-RM entity, the FT-RM entity may select one or more spine nodes that may (e.g., collectively) inject enough routes to block all traffic from going to a black hole, e.g., by redirecting traffic. The FT-RM entity may select one or more routes that may be injected or installed. The FT-RM entity may select one or more spine nodes to install the one or more routes.

Figure 7:
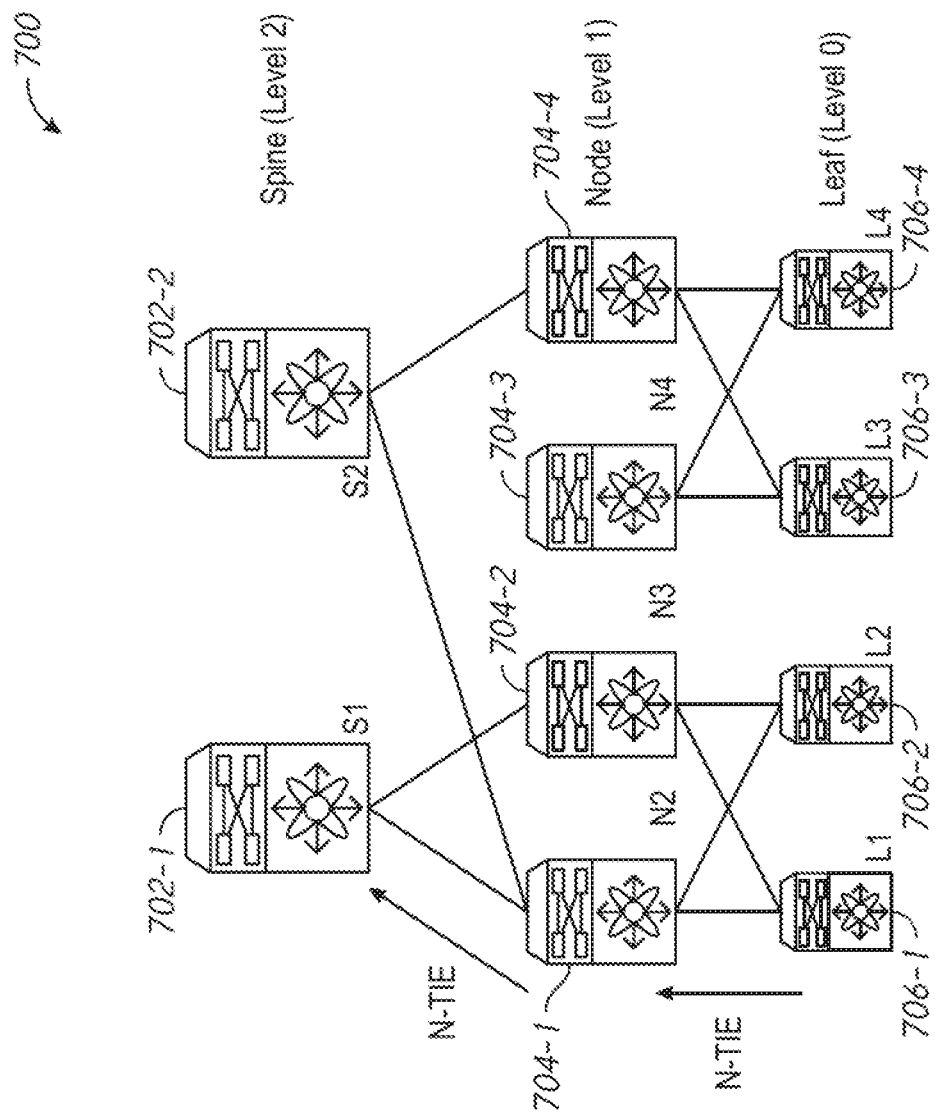
FIG. 7 is diagram illustrating an example partitioned spine.

FIG. 7 illustrates an example partitioned spine in a network 700 that may result in traffic black holes. The network 700 may include spine nodes 702-1, 702-2. The network 700 may include mid-level nodes 704-1, 704-2, 704-3, 704-4. The network may include leaf nodes 706-1, 706-2, 706-3, 706-4. RIFT may use node Topology Information Element (TIE) reflection to propagate traffic along more specific routes. Nodes at a level, e.g., level[n], may reflect a node TIE from a higher level, e.g., level[n+1], to other nodes in the higher level, e.g., level[n+1]. Nodes at the higher level, e.g., level[n+1], may use adjacency details to identify the need for disaggregation. However, this mechanism may not work in all scenarios. If there is no common node or link between neighbors at the same level, reflection may fail. For example, spine nodes 702-1, 702-2 may not be able to reflect the node TIE. This may cause issues related to black holing and improper disaggregation. For instance, in one example failure scenario, node reflection between the partitioned spine node may not be possible. In this example, there may be no disaggregated prefix advertisement from any spine nodes. Traffic from leaf nodes 706-1, 706-2, 706-3, 706-4 may be load balanced between mid-level nodes 704-2, 704-3. Traffic from the mid-level node 704-2 may be forwarded to the spine node 702-1 and may perform as expected. Traffic from the mid-level node 704-3 may be forwarded to the spine node 702-1, and traffic may be black holed.

Figure 8:
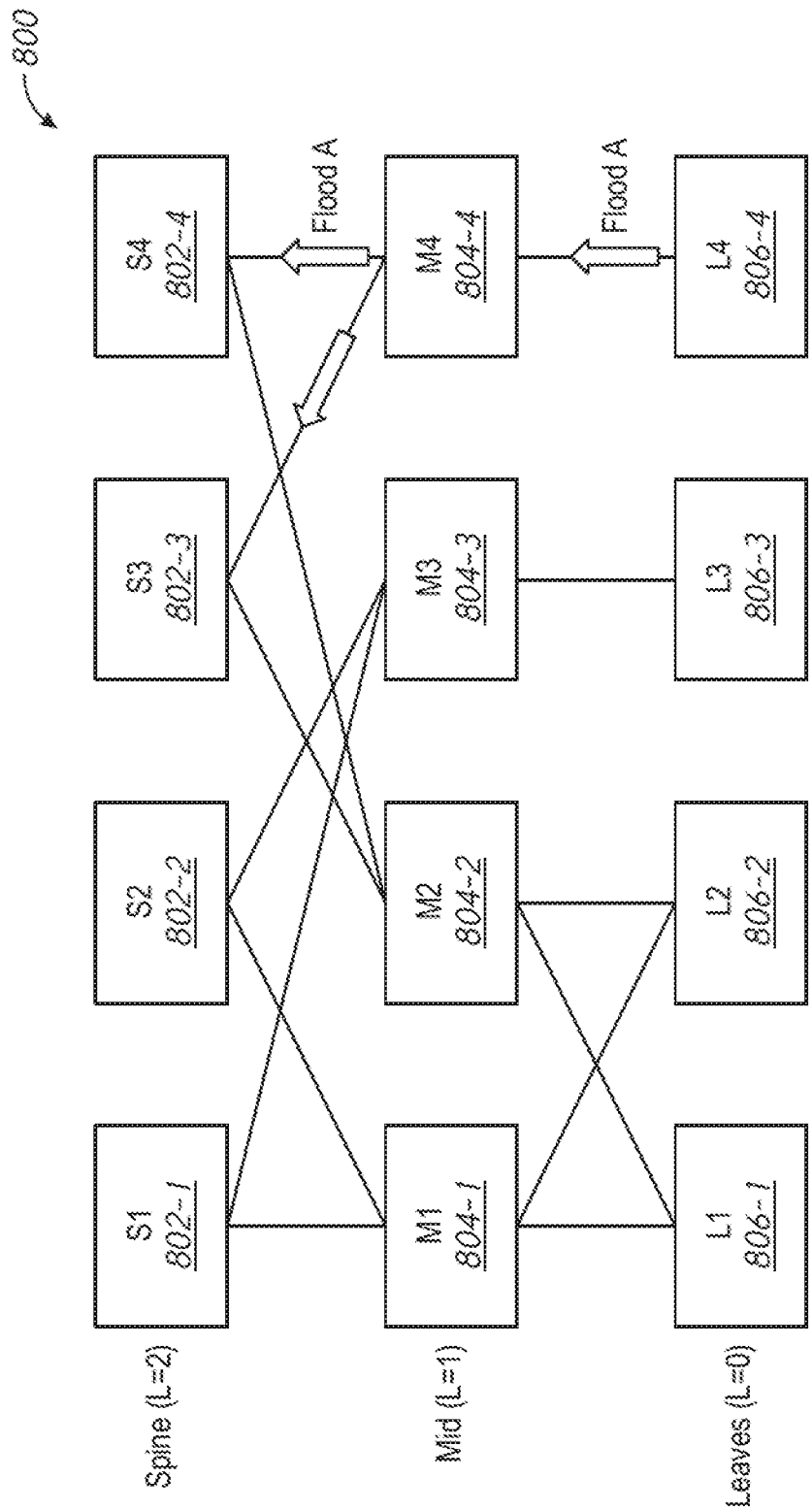
FIG. 8 is an example node graph illustrating an example network.

FIG. 8 is a node graph illustrating an example network 800. The network 800 may include spine nodes 802-1, 802-2, 802-3, 802-4. The network 800 may include mid-level nodes 804-1, 804-2, 804-3, 804-4. The network 800 may include leaf nodes 806-1, 806-2, 806-3, 806-4. The network 800 may experience a second example failure scenario in which node reflection between partitioned mid-level nodes 804-3 and 804-4 may not be possible. Traffic from the leaf node 806-1 to the leaf node 806-4 may be load balanced between the mid-level nodes 804-1 and 804-2. Traffic from the mid-level node 804-1 may be load balanced to the spine nodes 802-1 and 802-2, and traffic may be black holed. Traffic from the mid-level node 804-2 may be load balanced the spine nodes 802-3 and 802-4, and all traffic may perform as expected.

Figure 9:
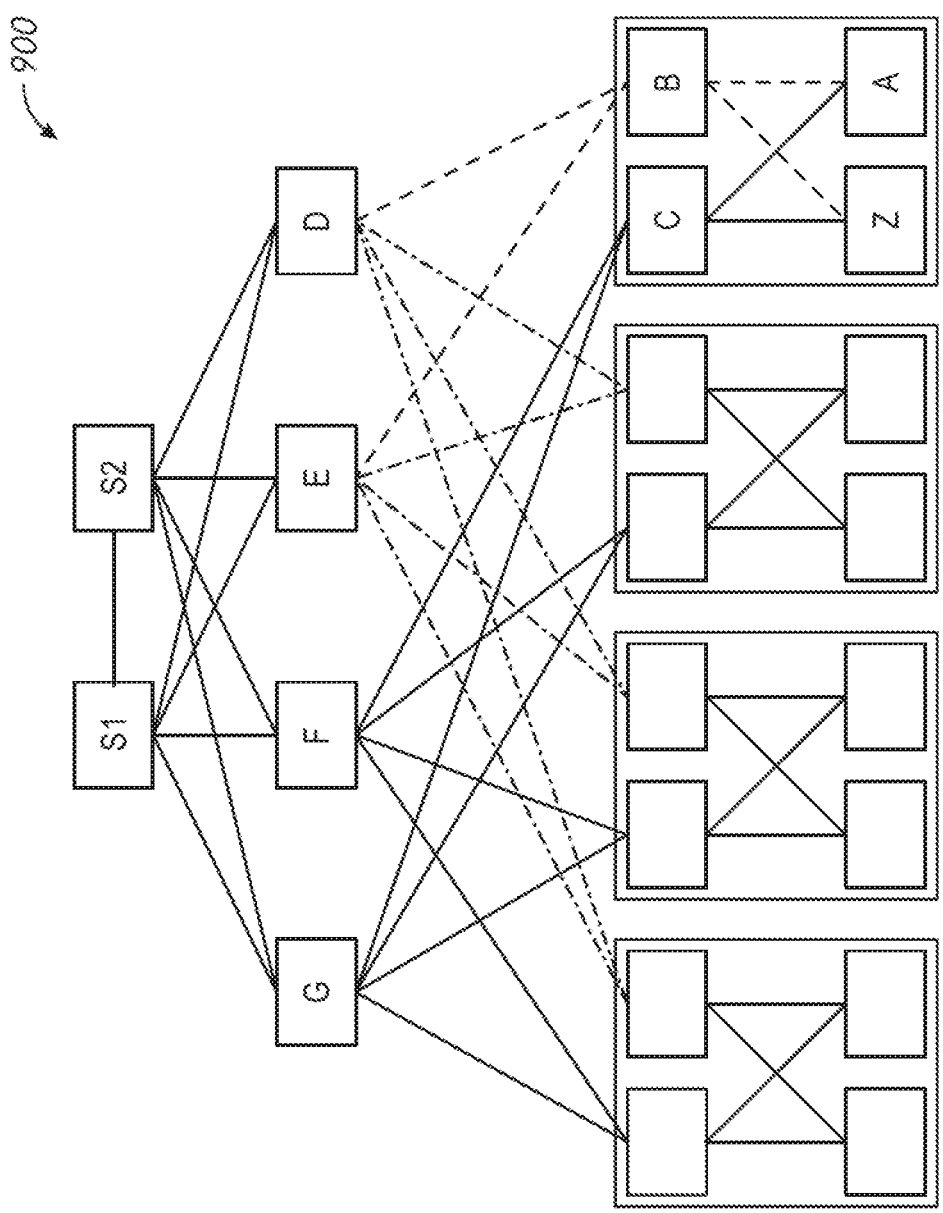
FIG. 9 is an example node graph illustrating an example spine reflector.

FIG. 9 is a node graph illustrating an example spine reflector 900 that may be used to maintain the set of all reachable prefixes and share the set of reachable prefixes with all spine nodes. The spine reflector 900 may include spine nodes S1 and S2 and prefixes A-G. Two spine reflectors may be used for redundancy, in which case the spine reflector may synchronize via a dedicated link. A routing spine reflector may be used. A non-routing spine reflector may be used.

Figure 10:
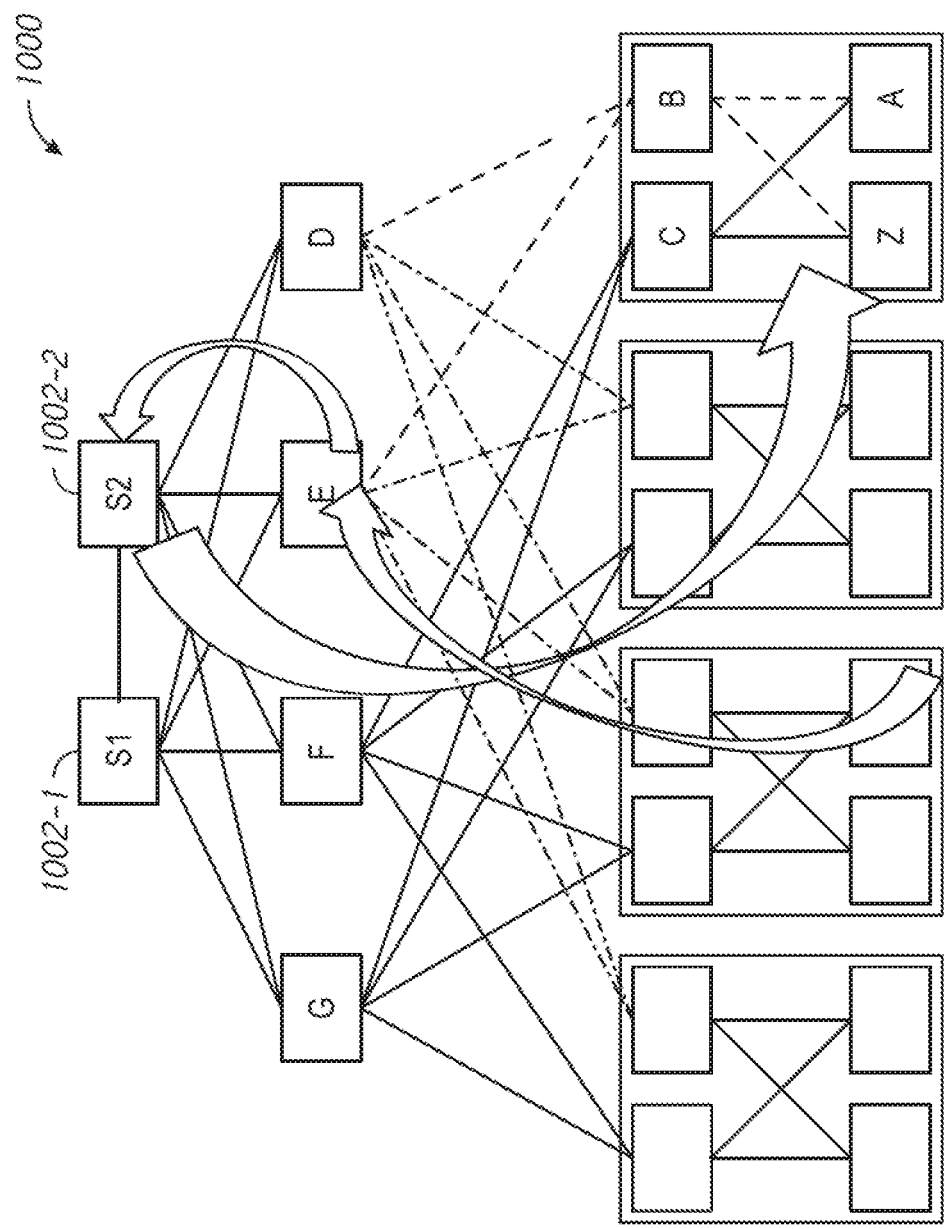
FIG. 10 is an example node graph illustrating an example routing spine reflector.

FIG. 10 is a node graph illustrating an example routing spine reflector 1000. Routing, e.g., without overload, may mean that spine nodes 1002-1 and 1002-2 may form a superspine. As such, the spine nodes 1002-1 and 1002-2 should not observe a packet unless there is a breakage. An additional breakage (between the reflector and the spine) may prompt routing between reflectors, as indicated by the arrows in FIG. 10.

Figure 11:
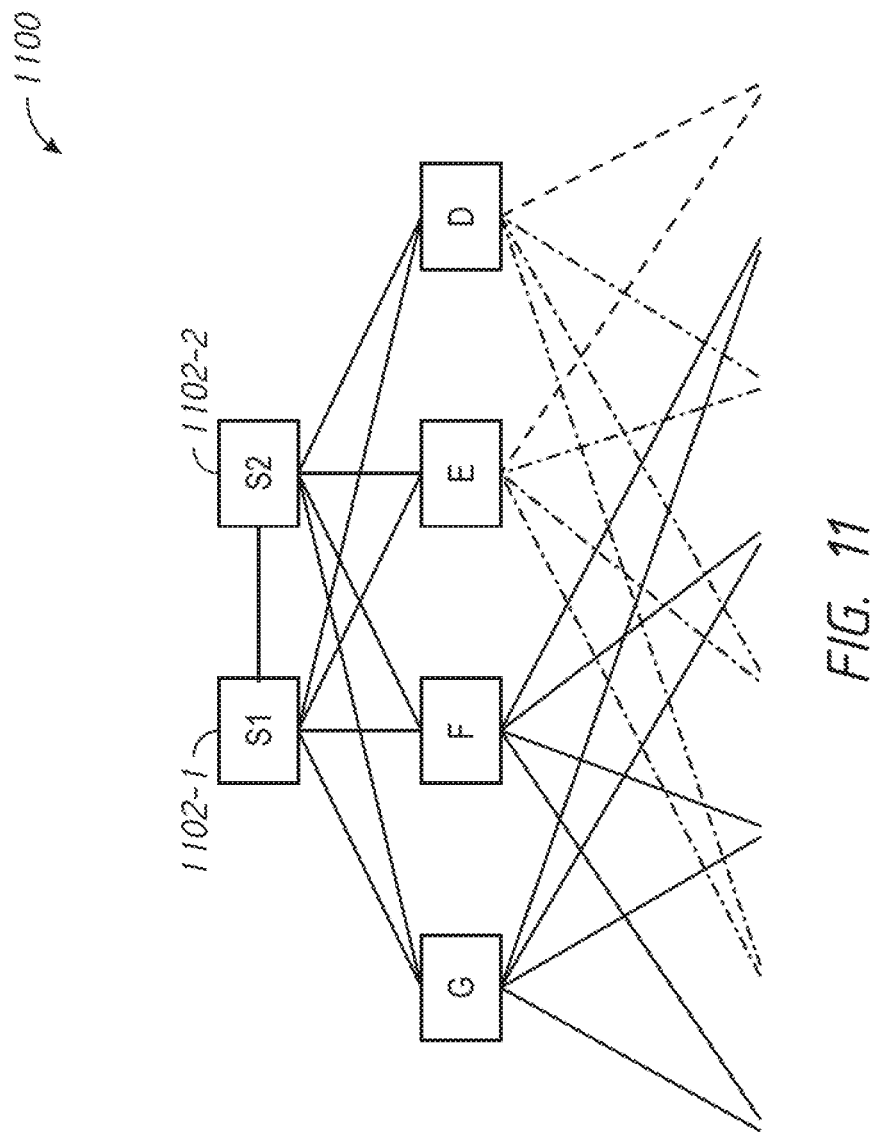
FIG. 11 is an example node graph illustrating an example non-routing spine reflector.

FIG. 11 is a node graph illustrating an example non-routing spine reflector 1100. In a non-routing spine reflector, spine nodes 1102-1 and 1102-2 may disaggregate based on information received from the reflectors. Disaggregation processes for a non-routing spine reflector may be positive or negative. In the positive disaggregation process, the spine nodes 1102-1 and 1102-2 may learn the prefixes seen by the other spine nodes and may disaggregate the prefixes that those spine nodes observe but the other spine nodes do not. In the negative disaggregation process, the spine nodes 1102-1 and 1102-2 may learn the aggregated list of prefixes and negatively disaggregate the prefixes that they do not observe.

In some embodiments, a fat tree route miner (FT-RM) entity or a virtual route miner (vRM) may be implemented as a virtual Network Function (vNF) entity. The FT-RM entity may be a control plane entity for fat tree routing protocols such as Routing in Fat Trees (RIFT) or Intermediate System to Intermediate System (ISIS)-spine-leaf. The FT-RM entity may create a control plane session for spine nodes (e.g., only for spine nodes) and may leverage border gateway protocol-link state (BGP-LS) and/or a RIFT extension to retrieve the list of prefixes that are reachable from each spine node. The entire topology may also be provided (e.g., at a higher cost in control) so as to decide optimally where and by which spine node the disaggregated routes are installed. The FT-RM entity may create adjacency with all spine nodes.

The FT-RM entity may analyze a list of prefixes from each spine node in order to identify one or more prefixes that one or more spine nodes cannot reach. The FT-RM entity may select one or more of the other spine nodes to disaggregate the prefixes to avoid traffic black holing. The FT-RM entity may instruct each spine node of a collection of prefixes to disaggregate and/or instruct the relevant spine node to advertise a disaggregated prefix. The FT-RM may maintain control over spine nodes over time (e.g., in case one or more spine nodes regains reachability to a prefix). If the entire topology is available to the FT-RM entity, the FT-RM entity may select one or more spine nodes that can (e.g., collectively) inject enough routes to block all traffic from entering a black hole. The FT-RM entity may further select which routes must be installed and by which spine node. This may help avoid traffic black holing in an optimistic manner. The fat tree RM may involve an optimistic approach based on disaggregation propagation. Both approaches may be combined together for rapid advertisement (pessimistic) followed by optimization (optimistic).

Figure 12:
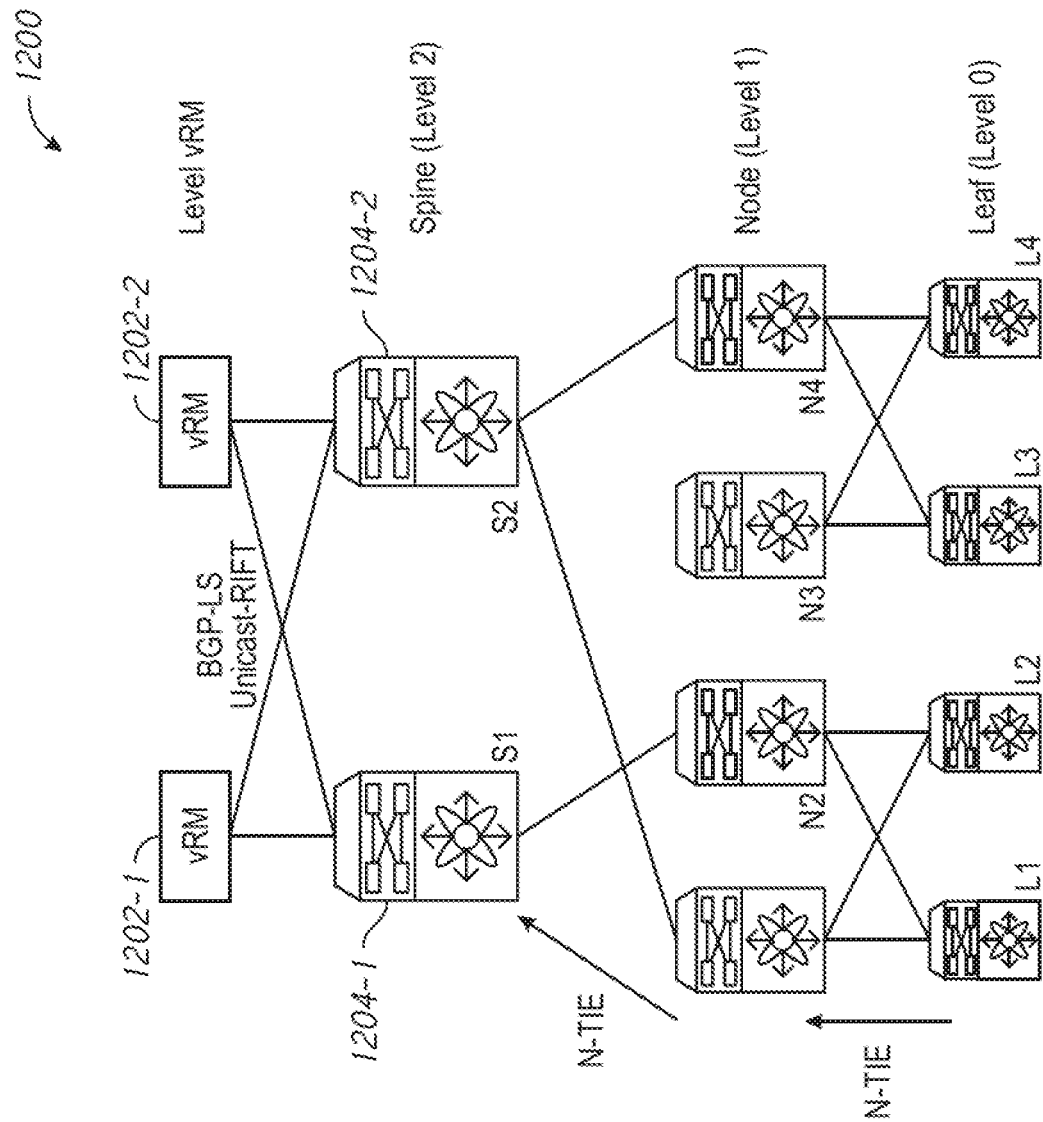
FIG. 12 is an example node graph illustrating an example network.

FIG. 12 is a node graph illustrating how one or more FT-RM entities 1202-1, 1202-2 may use BGP-LS or RIFT extensions and therefore may not need to be directly connected to spine layer. This may not involve data traffic forwarding or reflecting any routes between spine nodes 1204-1, 1204-2. In a network 1200, the one or more FT-RM entities 1202-1, 1202-2 may perform operations relating to prefix and/or topology collection, prefix disaggregator computation, and prefix disaggregation signaling. With respect to prefix/topology collection, the one or more FT-RM entities 1202-1, 1202-2 may extend BGP-LS or RIFT to extract the full topology, and may retrieve the full topology details of all the pods and/or levels. A simple session to each spine may be sufficient. With respect to disaggregator computation, the one or more FT-RM entities 1202-1, 1202-2 may compute the topology to identify any need for prefix disaggregation by comparing the adjacency between nodes in same pod and/or level. With respect to prefix disaggregation signaling, the one or more FT-RM entities 1202-1, 1202-2 may extend RIFT signaling mechanism (e.g., Key Value TIEs) to signal a disaggregator node. The one or more FT-RM entities 1202-1, 1202-2 may carry simplified adjacency details that may be used by a disaggregator node to advertise the disaggregated prefixes.

Figure 13:
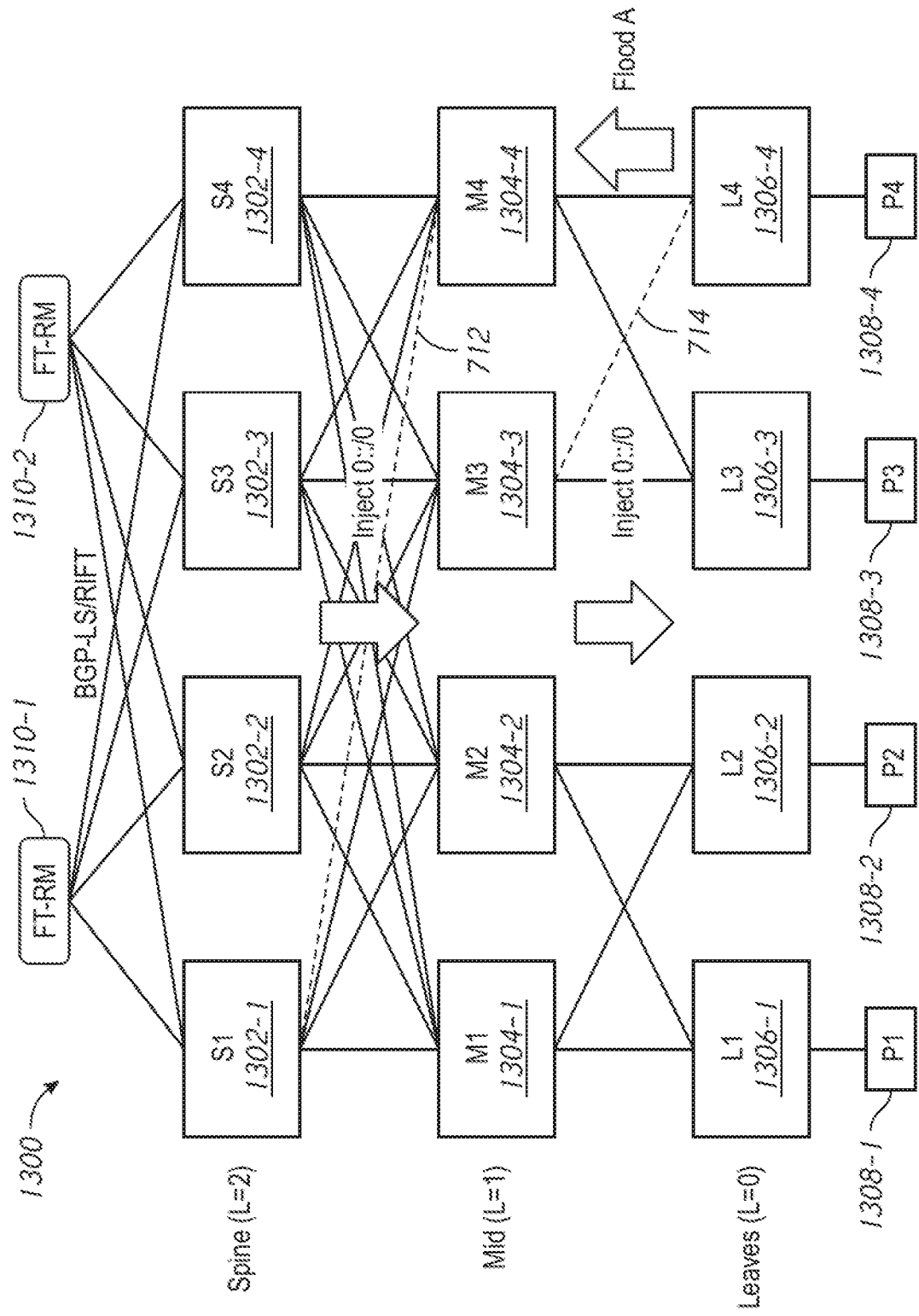
FIG. 13 is an example node graph that illustrates an example network.

In some embodiments, the FT-RM entity may collect information relating to one or more prefixes and/or relating to a network topology. FIG. 13 is an example node graph that illustrates an example network 1300. The network 1300 may include spine nodes 1302-1, 1302-2, 1302-3, and 1302-4, which may be collectively referred to as spine nodes 1302. The network 1300 may include mid-level nodes 1304-1, 1304-2, 1304-3, and 1304-4, which may be collectively referred to as mid-level nodes 1304. The network 1300 may include leaf nodes 1306-1, 1306-2, 1306-3, and 1306-4, which may be collectively referred to as leaf nodes 1306. Prefixes 1308-1, 1308-2, 1308-3, and 1308-4 (collectively referred to as prefixes 1308) may be attached to the leaf nodes 1306-1, 1306-2, 1306-3, and 1306-4, respectively.

The network 1300 may include one or more FT-RM entities 1310-1, 1310-2 (collectively referred to as FT-RM entities 1310) that may establish a control plane session with the spine nodes 1302. The one or more FT-RM entities 1310 may use BGP-LS or RIFT (e.g., an extension or extensions to RIFT) to establish a control plane session with the spine nodes 1302. One or more FT-RM entities 1310 may use the control plane session to retrieve a list of prefixes (e.g., a complete list of prefixes, for example, list(prefix)) from one or more of the spine nodes 1302 that may be learned by a fat tree protocol, such as RIFT or ISIS-SL. In some embodiments, one or more FT-RM entities 1310 may retrieve the full topology information from the spine nodes 1302. For example, in RIFT or ISIS-SL, the spine nodes 1302 may have the complete topology view.

As shown in FIG. 13, each FT-RM entity 1310-1, 1310-2 may have a control plane session with each spine node 1302-1, 1302-2, 1302-3, and 1302-4. These control plane sessions may not be used for data traffic.

In some embodiments, the one or more FT-RM entities 1310 may perform prefix disaggregator computation. Prefix disaggregator computation may be performed in a simple mode. In the simple mode, one or more FT-RM entities may compare one or more lists of prefixes from one or more spine nodes 1302, e.g., from each spine node 702. In an ideal situation, e.g., in a situation without any failed links, all of the spine nodes 1302 may be expected to have the same set of prefixes learned from the RIFT. Any discrepancy between the lists of prefixes obtained from the spine nodes 1302 may indicate that route disaggregation should be performed.

If the one or more FT-RM entities 1310 obtain different lists of prefixes from the spine nodes 1302, the one or more FT-RM entities 1310 may identify the spine nodes 1302 that may be required to perform route disaggregation.

The network 1300 may have one or more broken links, e.g., links 712 and 714 indicated by dashed lines in FIG. 13. Due to these broken links, one or more spine nodes 1302 may be isolated from the leaf nodes 1306. For example, the spine node 1302-1 may be isolated from the leaf node 1306-4. As a result, floodings from and about the leaf node 1306-4 may not reach the spine node 1302-1.

Figure 14:
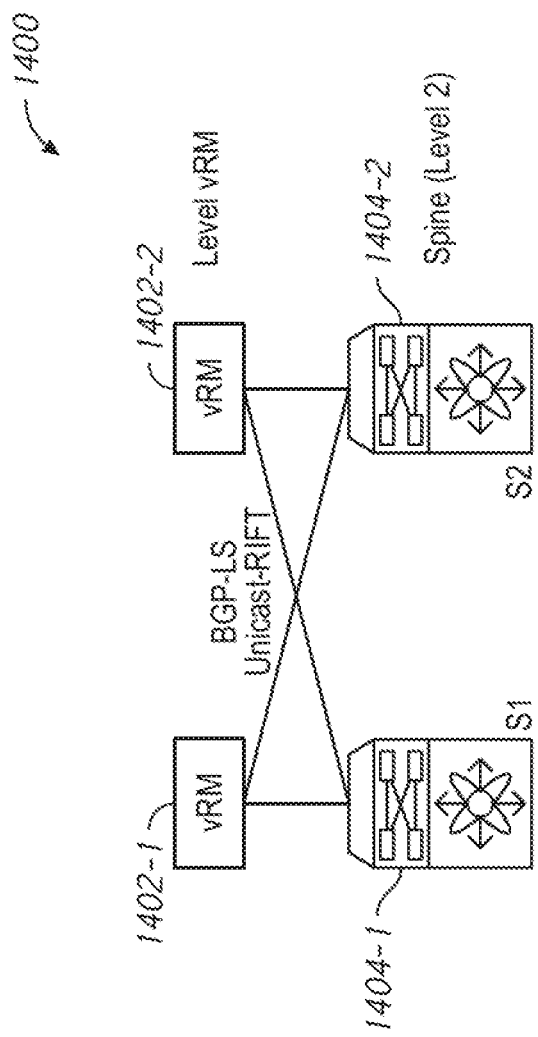
FIG. 14 is a diagram illustrating a portion of an example network.

FIG. 14 illustrates a portion of an example network 1400 to show how BGP-LS or RIFT may be extended for topology collection. One or more FT-RM entities 1402-1, 1402-2 (collectively referred to as FT-RM entities 1402) may not be directly connected to spine nodes 1404-1, 1404-2 (collectively referred to as spine nodes 1404), and there may be no link discovery mechanism. The sessions may be dynamic or manual. Since the number of spine nodes 1404 may be relatively low, manual configuration may be performed. Each spine node 1404 may create a session with each FT-RM entity 1402. Two or more FT-RM entities 1402 may be used for redundancy purposes.

Figure 15:
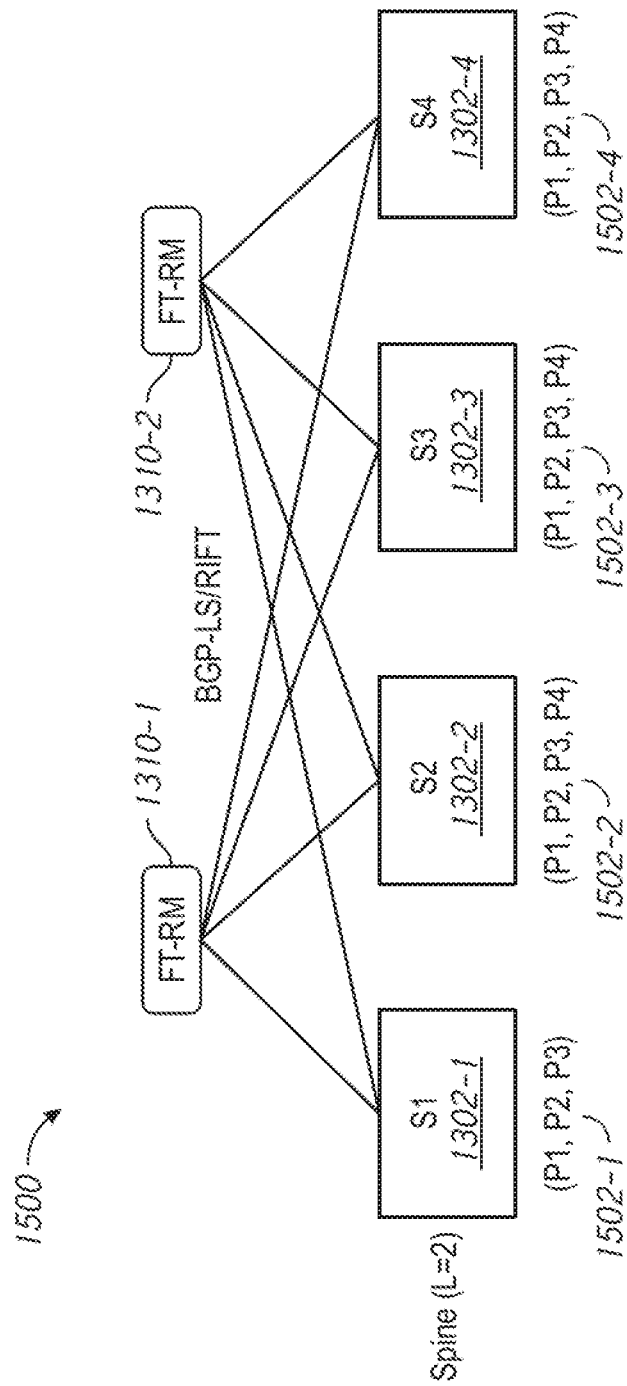
FIG. 15 is a node graph illustrating a simplified topology of the network of FIG. 13.

FIG. 15 is a node graph illustrating a simplified topology of the network 1300. In particular, FIG. 15 illustrates the spine nodes 1302-1, 1302-2, 1302-3, and 1302-4 and the one or more FT-RM entities 1310-1 and 1310-2. FIG. 15 also illustrates prefix lists 1502-1, 1502-2, 1502-3, and 1502-4 (collectively referred to as prefix lists 802) that may be obtained for each spine node 1302-1, 1302-2, 1302-3, and 1302-4, respectively, by the one or more FT-RM entities 1310-1 and 1310-2. Each prefix list 802 may include a list of prefixes that are reachable by a given spine node. As shown in FIG. 15, the prefix lists 1502-2, 1502-3, and 1502-4 each include prefixes (P1, P2, P3, P4), indicating that these prefixes are reachable by spine nodes 1302-2, 1302-3, and 1302-4, respectively. The prefix list 1502-1 also includes prefixes (P1, P2, P3), but is missing prefix P4. This may indicate that, while prefixes P1, P2, and P3 are reachable by spine node 1302-1, prefix P4 is not.

The one or more FT-RM entities 1310 may detect the discrepancy between the prefix lists, e.g., that the prefix list 1502-1 is missing prefix P4. One or more FT-RM entities 1310 may identify the need for prefix disaggregation. For example, one or more FT-RM entities 1310 may determine that prefix P4 may need to be disaggregated.

This approach of comparing prefixes between the spine nodes 1302 may help avoid traffic black holing. Suboptimal traffic paths may still occur. For example, in the network 1300 of FIG. 13, the link failure of the link 714 between the mid-level node 1304-3 and the leaf node 1306-4 may cause suboptimal path forwarding. In this case, when the leaf node 1306-3 load balances the traffic to prefix P4 via the mid-level node 1304-3, the traffic goes all the way north to the spine and then comes back south.

Prefix disaggregator computation may be performed in an aggressive mode to address scenarios that may lead to suboptimal path forwarding. In the aggressive mode, one or more FT-RM entities 1310 may compare adjacencies between nodes in the same pod and at the same level. The one or more FT-RM entities 1310 may use any discrepancy in the adjacencies to identify the need for route disaggregation.

Figure 16:
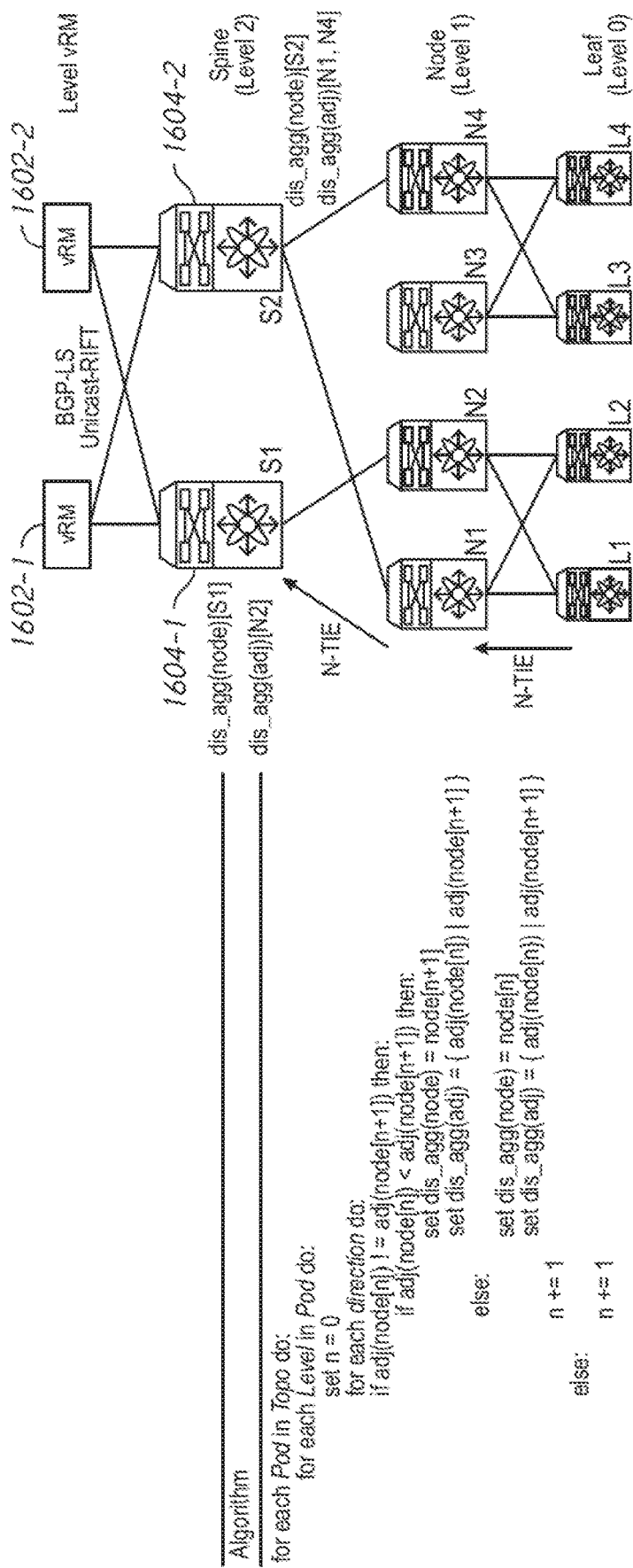
FIG. 16 is a diagram illustrating an example operation of a fat tree route miner entity.

FIG. 16 illustrates how one or more FT-RM entities 1602-1, 1602-2 may perform operations relating to disaggregator computation by comparing the adjacencies between all nodes in the same pod and/or level. The one or more FT-RM entities 1602-1, 1602-2 may first perform computations for spine nodes 1604-1, 1604-2, and then for the nodes within the pod. Any discrepancy in adjacency may be marked for prefix disaggregation. The algorithm may be changed to reflect the prefixes. The one or more FT-RM entities 1602-1, 1602-2 may signal dis_agg(node) and dis_agg(adj) details to the relevant nodes. The one or more FT-RM entities 1602-1, 1602-2 may use a Key Value TIE or other unicast mechanism. The need for prefix disaggregation may be signaled in a controlled manner.

Figure 17:
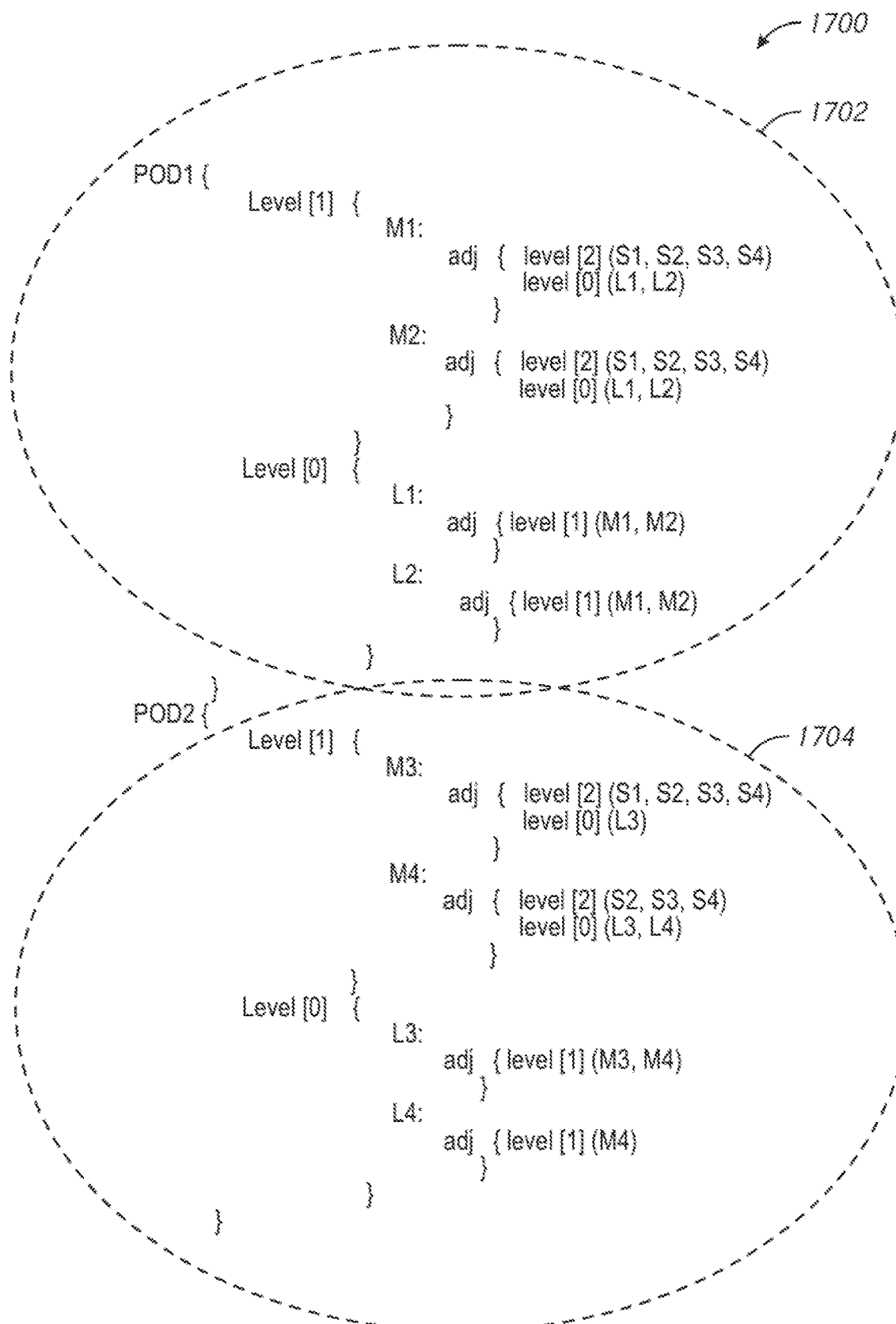
FIG. 17 illustrates an example data structure that may store adjacency information for the network of FIG. 13.

Adjacency information may be stored in one or more data structures. Adjacency information may include, for example, information identifying one or more nodes that are adjacent to a given node in a network. FIG. 17 illustrates an example data structure 1700 that may store adjacency information for the network 1300. One portion 1702 of the data structure 1700 may store adjacency information for one pod, e.g., "POD1", of the network 1300. Another portion 1704 of the data structure 1700 may store adjacency information for another pod, e.g., "POD2", of the network 1300.

Based on the adjacency information in the data structure 1700, no discrepancies are present for the pod identified as "POD1". For example, a comparison may be made between adjacent spine nodes of selected mid-level nodes, e.g., POD1.Level[1].M1.adj(level[2])=POD1.Level[1].M2.adj(level[2])

That is, the mid-level nodes 1304-1 and 1304-2 have the same adjacent nodes at the spine level, e.g., spine nodes 1302-1, 1302-2, 1302-3, and 1302-4. This may indicate that there is no need for disaggregation. As another example, POD1.Level[1].M1.adj(level[0])=POD1.Level[1].M2.adj(level[0])

That is, the mid-level nodes 1304-1 and 1304-2 have the same adjacent nodes at the leaf level, e.g., leaf nodes 1306-1 and 1306-2.

Based on the adjacency information in the data structure 1700, the pod identified as "POD2" has discrepancies. For example, POD2.Level[1].M3.adj(level[2])!=POD2.Level[1].M4.adj(level[2])

That is, the mid-level node 1304-3 has different adjacent nodes at the spine level, e.g., spine nodes spine nodes 1302-1, 1302-2, 1302-3, and 1302-4, than the mid-level node 1304-4, which does not have spine node 1302-1 as an adjacent node at the spine level. As another example, POD2.Level[1].M3.adj(level[0])!=POD2.Level[1].M4.adj(level[0])

That is, the mid-level node 1304-3 has different adjacent nodes at the leaf level, e.g., leaf node 1306-3, than the mid-level node 1304-4, which has leaf nodes 1306-3 and 1306-4 as adjacent nodes.

In some embodiments, the one or more FT-RM entities 1310 may use one or more of these discrepancies to determine that an adjacency between the mid-level node 1304-3 and the leaf node 1306-4 is missing. For example, the one or more FT-RM entities 1310 may compare the lists of adjacent nodes for a given node to determine one or more nodes that are identified as adjacent nodes to one node at a given level in a pod, but not as adjacent nodes to another node at the same level in the same pod.

Similarly, the one or more FT-RM entities 1310 may use one or more of these discrepancies to determine that an adjacency between the mid-level node 1304-4 and the spine node 1302-1 is missing. The one or more FT-RM entities 1310 may then determine that the mid-level node 1304-4 may disaggregate prefix P4 for improved (e.g., optimal) path forwarding.

In some embodiments, the one or more FT-RM entities 1310 may perform prefix disaggregator signaling. For example, when the one or more FT-RM entities 1310 have identified the need for disaggregation, the one or more FT-RM entities 1310 may use control plane signaling to instruct a disaggregator node to advertise more specific (e.g., disaggregated) prefixes. The one or more FT-RM entities 1310 may use unicast-based signaling. The one or more FT-RM entities 1310 may use controlled flooding by leveraging Key Value-TIE (KV-TIE) or a similar mechanism.

Figure 18:
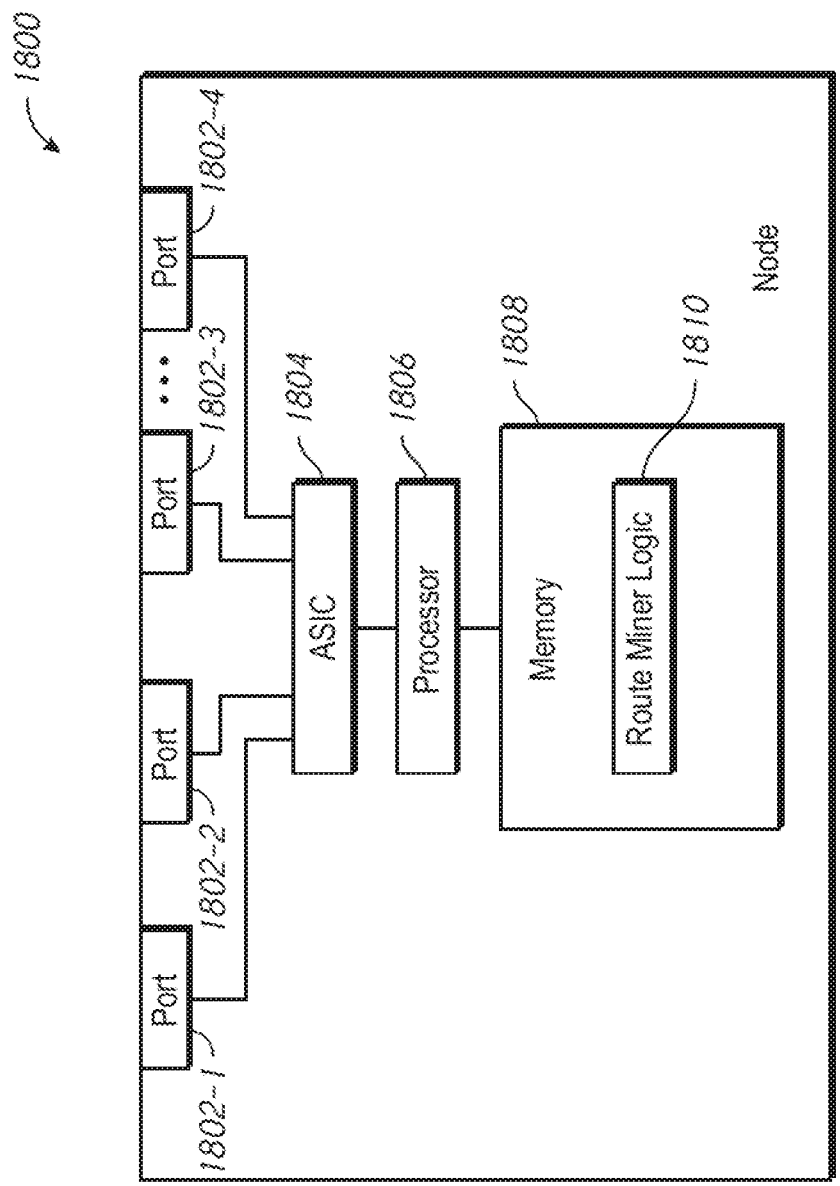
FIG. 18 is a block diagram illustrating an example network node.

FIG. 18 is a block diagram illustrating an example network node 1800, which may be implemented, for example, as a router, switch, or the like. The network node 1800 may be configured to implement the techniques disclosed herein. The network node 1800 may include a network interface in the form of a plurality of network ports 1802-1, 1802-2, 1802-3, ..., 1802-n, that may enable communications over a network, an application-specific integrated circuit (ASIC) 1804 that may perform network processing functions, one or more processors (e.g., microprocessors or microcontrollers) 1806, and a memory 1808 including route miner logic 1810.

Figure 19:
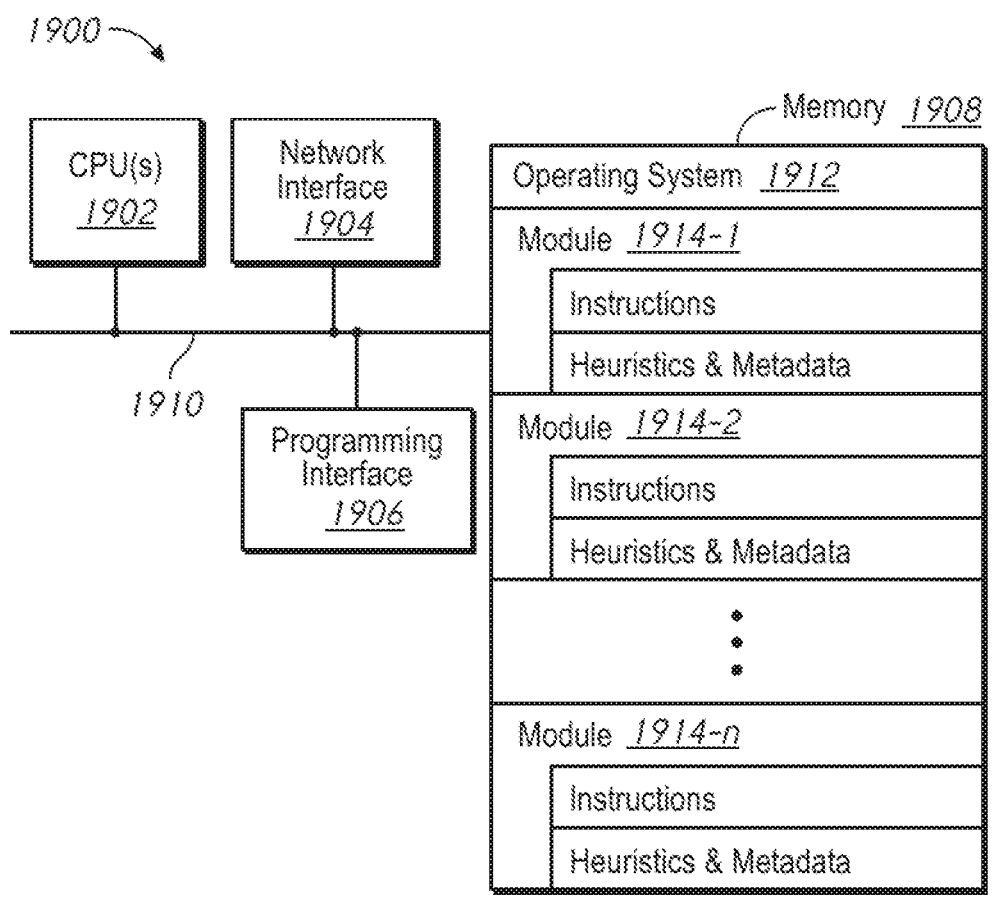
FIG. 19 is a block diagram of an example server system.

FIG. 19 is a block diagram of an example server system 1900 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 1900 may include one or more processing units (CPUs) 1902, a network interface 1904, a programming interface 1906, a memory 1908, and one or more communication buses 1910 for interconnecting these and various other components.

The network interface 1904 may be provided to, among other uses, establish and/or maintain a metadata tunnel between a cloud-hosted network management system and at least one private network including one or more compliant devices. In some embodiments, the one or more communication buses 1910 may include circuitry that interconnects and controls communications between system components. The memory 1908 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 1908 may include one or more storage devices remotely located from the one or more CPUs 1902. The memory 1908 may comprise a non-transitory computer readable storage medium.

In some embodiments, the memory 1908 or the non-transitory computer readable storage medium of the memory 1908 may include (e.g., store) the following programs, modules, and data structures, or a subset thereof including one or more of an operating system 1912 or various modules 1914-1, 1914-2, . . . , 1914-n. The modules 1914-1, 1914-2, . . . , 1914-n, individually and/or collectively, perform one or more of the operations described herein. To that end, in various embodiments, the modules 1914-1, 1914-2, . . . , 1914-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the second node are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    using a fat tree route miner (FT-RM) entity to establish a control plane session with a first spine node in communication with a network;
    identifying a prefix that is unreachable by the first spine node;
    instructing a spine node to disaggregate the prefix;
    receiving a first prefix list from the first spine node, the first prefix list comprising a list of prefixes that are reachable by the first spine node;
    receiving a second prefix list from a second spine node in communication with the network, the second prefix list comprising a list of prefixes that are reachable by the second spine node; and
    determining a prefix to disaggregate based on a discrepancy between the first prefix list and the second prefix list.

2. The method of claim 1, further comprising:
    receiving topology information relating to the network at the FT-RM entity, wherein the network is in communication with a plurality of spine nodes; and
    selecting, based on the topology information, a second spine node to inject a route to redirect traffic.

3. The method of claim 2, further comprising:
    selecting a plurality of routes to inject for redirecting traffic; and
    selecting a plurality of spine nodes for injecting the selected routes.

4. The method of claim 1, wherein the network is in communication with at least a second spine node, the method further comprising selecting the second spine node to disaggregate the prefix.

5. The method of claim 1, further comprising, on a condition that the prefix becomes reachable to the first spine node, removing a disaggregation of the prefix.

6. A device comprising:
    a network interface in communication with a network;
    a processor configured to execute computer readable instructions included on a non-transitory memory; and
    a non-transitory memory including processor-readable instructions, that when executed by the processor, cause the device to:
        use a fat tree route miner (FT-RM) entity to establish a control plane session with a first spine node in communication with the network;
        identify a prefix that is unreachable by the first spine node;

instruct a spine node to disaggregate the prefix;
receive first adjacency information from the first spine node, the first adjacency information identifying one or more nodes that are adjacent to the first spine node;
receive second adjacency information from a second spine node in communication with the network, the second adjacency information identifying one or more nodes that are adjacent to the second spine node; and
determine a prefix to disaggregate based on a discrepancy between the first adjacency information and the second adjacency information.

7. The device of claim 6, wherein the processor-readable instructions cause the device to:
receive topology information relating to the network at the FT-RM entity, wherein the network is in communication with a plurality of spine nodes; and
select, based on the topology information, a second spine node to inject a route to redirect traffic.

8. The device of claim 7, wherein the processor-readable instructions cause the device to:
select a plurality of routes to inject for redirecting traffic; and
select a plurality of spine nodes for injecting the selected routes.

9. The device of claim 6, wherein the network is in communication with at least a second spine node, and wherein the processor-readable instructions cause the device to select the second spine node to disaggregate the prefix.

10. The device of claim 6, wherein the processor-readable instructions cause the device to, on a condition that the prefix becomes reachable to the first spine node, remove a disaggregation of the prefix.

11. The device of claim 6, wherein the first adjacency information and the second adjacency information identify nodes in a same pod of the network.

12. The device of claim 6, wherein the first adjacency information and the second adjacency information identify nodes in a same level of the network.

13. A non-transitory computer readable storage medium storing one or more programs, the one or more programs comprising instructions, that, when executed by a computing device with a non-transitory memory and one or more processors, cause the computing device to perform or cause performance of:
using a fat tree route miner (FT-RM) entity to establish a control plane session with a first spine node in communication with a network;
identifying a prefix that is unreachable by the first spine node;
instructing a spine node to disaggregate the prefix;
receiving a first prefix list from the first spine node, the first prefix list comprising a list of prefixes that are reachable by the first spine node;
receiving a second prefix list from a second spine node in communication with the network, the second prefix list comprising a list of prefixes that are reachable by the second spine node; and
determining a prefix to disaggregate based on a discrepancy between the first prefix list and the second prefix list.

14. The non-transitory computer readable storage medium of claim 13, wherein the instructions cause the computing device to perform or cause performance of:
receiving topology information relating to the network at the FT-RM entity, wherein the network is in communication with a plurality of spine nodes; and
selecting, based on the topology information, a second spine node to inject a route to redirect traffic.

15. The non-transitory computer readable storage medium of claim 14, wherein the instructions cause the computing device to perform or cause performance of:
selecting a plurality of routes to inject for redirecting traffic; and
selecting a plurality of spine nodes for injecting the selected routes.

16. The non-transitory computer readable storage medium of claim 13, wherein the network is in communication with at least a second spine node, wherein the instructions cause the computing device to perform or cause performance of selecting the second spine node to disaggregate the prefix.

17. The non-transitory computer readable storage medium of claim 13, wherein the instructions cause the computing device to perform or cause performance of, on a condition that the prefix becomes reachable to the first spine node, removing a disaggregation of the prefix.

* * * * *